(12) United States Patent
Rekimoto

(10) Patent No.: US 7,873,836 B2
(45) Date of Patent: Jan. 18, 2011

(54) INFORMATION PROCESSING APPARATUS AND METHOD, RECORDING MEDIUM, PROGRAM, AND WIRELESS COMMUNICATION SYSTEM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1110 days.

(21) Appl. No.: 11/155,505

(22) Filed: Jun. 20, 2005

(65) Prior Publication Data

US 2006/0002558 A1    Jan. 5, 2006

(30) Foreign Application Priority Data

Jul. 5, 2004  (JP)  ............... 2004-198302

(51) Int. Cl.
*G06F 11/30* (2006.01)
*G06F 12/14* (2006.01)
*H04K 1/00* (2006.01)

(52) U.S. Cl. ...................... 713/189; 380/270
(58) Field of Classification Search ................ 726/201; 713/189; 380/270
See application file for complete search history.

(56) References Cited

U.S. PATENT DOCUMENTS 6,300,903 B1 * 10/2001 Richards et al. ............. 342/450
7,102,537 B2 * 9/2006 Inoue et al. ................. 340/903
7,383,053 B2 * 6/2008 Kent et al. ................ 455/456.5
7,397,379 B2 * 7/2008 Richards et al. .......... 340/573.1
2004/0025017 A1    2/2004 Ellison et al.
2005/0200476 A1 * 9/2005 Forr et al. ............... 340/539.13
2005/0201301 A1 * 9/2005 Bridgelall ................... 370/254

FOREIGN PATENT DOCUMENTS

| JP | 11-88275 | 3/1999 |
| JP | 2004-64763 | 2/2004 |
| WO | 2004/019559 A2 | 3/2004 |

* cited by examiner

*Primary Examiner* — Kambiz Zand
*Assistant Examiner* — Stephen Sanders
(74) *Attorney, Agent, or Firm* — Oblon, Spivak, McClelland, Maier & Neustadt, L.L.P.

(57) ABSTRACT

The present invention provides a wireless communication system having a first information processing apparatus and a second information processing apparatus communicating with each other in a wireless manner. The first information processing apparatus includes first transmission means for transmitting a wireless signal for computing a position of the first information processing apparatus to a second information processing apparatus. The second information processing apparatus includes first reception means, computation means, determination means, and second transmission means. The first information processing apparatus further includes second reception means for receiving the data transmitted from the second information processing apparatus.

13 Claims, 19 Drawing Sheets

INFORMATION PROCESSING APPARATUS AND METHOD, RECORDING MEDIUM, PROGRAM, AND WIRELESS COMMUNICATION SYSTEM

BACKGROUND OF THE INVENTION

The present invention relates to an information processing apparatus and method, a recording medium, a program, and a wireless communication system and, more particularly, to an information processing apparatus and method, a recording medium, a program, and a wireless communication system that are suitably applicable to user authentication.

Recently, services are in wide use in which user authentication is executed by use of a wired or wireless communication system to provide various kinds of information and commercial products to authenticated users (or authorized users). For the user authentication, a method is known in which a distance between a receiver apparatus and a user-operated terminal apparatus from which signals are transmitted to the receiver apparatus is measured.

It is known that RFID (Radio Frequency Identification) is used for the method of authentication based on the distance between a receiver apparatus and a terminal apparatus. In this RFID-based method, user authentication is executed by getting an RFID (or an RF tag) in which personal information such as user ID (Identification) is stored. The REID is wirelessly communicated being closed to the reader of each receiver apparatus. In this case, user authentication is executed on the basis of the user ID received from the RF tag and the distance between the RF tag and the reader. Some RFID-based wireless communication systems generate a power necessary for operation by the principle of electromagnetic coupling, thereby eliminating the necessity for incorporating a power supply in the RF tag.

Also, a method of identifying user's current position on the basis of GPS (Global Positioning System) is currently available (for example, refer to patent document 1 below) . In the GPS-based method, a mobile phone receives a GPS signal from a GPS satellite and computes the current position of the mobile phone and the current time on the basis of the received GPS signal. Then, the mobile phone transmits the computed current position and current time to a server (or a receiver apparatus) in wireless communication.

Methods of authentication on the basis of user position include a method in which user authentication is executed on the basis of user's current position identified by GPS.

In addition, a method is available in which a time between the transmission of a radio signal (hereafter referred to as a transmission signal) to a user's terminal apparatus by an authenticating apparatus (hereafter referred to as a receiver apparatus) and the reception of a radio signal (hereafter referred to as a response signal) from the user's terminal in response to the transmission signal is counted to compute the distance between the terminal apparatus and the receiver apparatus, thereby executing user authentication on the basis of the obtained distance.

In the above-mentioned authentication method, the receiver apparatus transmits a transmission signal to the terminal apparatus and the terminal apparatus receives the transmission signal from the receiver apparatus. Next, the terminal apparatus generates a response signal in accordance with the received transmission signal and transmits the generated response signal to the receiver apparatus. Receiving the response signal from the terminal apparatus, the receiver apparatus transmits the transmission signal to the terminal apparatus and counts a time from the transmission of the transmission signal to the terminal apparatus to the reception of the response signal from the terminal apparatus, thereby computing a distance between the terminal apparatus and the receiver apparatus on the basis of the obtained time.

[Patent document 1]
Japanese Patent Laid-open No. 2004-32376

SUMMARY OF THE INVENTION

However, with the above-mentioned user authentication method based on RFID, the RF tag must be placed in vicinity of the reader, thereby presenting a problem that the RF tag reading position is determined by the position of the reader. Also, if the output of the energy from the RF tag is strengthened, another RF tag positioned in the vicinity may be erroneously recognized.

In addition, with the RFID-based user authentication, the distance between the RF tag and the reader is obtained on the basis of the electric field intensity outputted from the RF tag, so that, if a malicious third party outputs an energy from his RF tag that is four times as high that from the authentic RF tag from a distance that is double the distance between the authentic RF tag and the reader, for example, the malicious third party may be recognized as the authorized user, thereby making it difficult to prevent masquerading.

Further, with the above-mentioned GPS-based method, the mobile phone computes the position of user (or the mobile phone) and transmits the obtained user position to the server, thereby presenting a problem of permitting positional alteration on the mobile phone.

Still further, with the above-mentioned method of counting a time from the transmission of a transmission signal by the receiver apparatus to the terminal apparatus and the reception of a response signal from the terminal apparatus, if the obtained time is longer than a predetermined time, a third party may intentionally delay the transmission of a response signal on the user terminal apparatus in user authentication processing, thereby making it possible for the third party to masquerade.

On the other hand, if the obtained time is shorter than a predetermined time, a delay in the transmission and reception of transmission signal and response signal and a time necessary from the reception of a transmission signal to the transmission of a response signal on the terminal apparatus must be taken into account in user authentication processing. Consequently, this time must be set in accordance with the terminal apparatus that is lower in processing performance, thereby making it difficult to prevent masquerading by a third party having a terminal apparatus that is higher in processing performance.

Thus, in the authentication based on the distance between the user terminal apparatus and the receiver apparatus that receives signals from the user terminal apparatus, an area in which the user is determined to be an authentic user (this area is hereafter referred to as an authentication area) may be set only in the vicinity of each apparatus that receives signals from the terminal apparatus.

Consequently, arranging a plurality of authentication areas requires to arrange the same number of receiver apparatuses that receive signals from the terminal apparatus as the number of authentication areas, thereby complicating the system and pushing up the cost thereof.

It is therefore desirable to arrange a plurality of authentication areas in any positions. It is another object of the present invention to prevent masquerading by a third party.

According to an embodiment of the present invention, there is provided a wireless communication system having a first information processing apparatus and a second information processing apparatus communicating with each other in a wireless manner. The first information processing apparatus includes first transmission means for transmitting a wireless signal for computing a position of the first information processing apparatus to a second information processing apparatus. The second information processing apparatus includes: first reception means for receiving the wireless signal transmitted from the first information processing apparatus at a plurality of positions; computation means for computing a position of the first information processing apparatus on the basis of reception times of the wireless signal received at the plurality of positions; determination means for determining whether the computed position of the first information processing apparatus is inside a predetermined area; and second transmission means for transmitting, if the computed position of the first information processing apparatus is found inside the area, data necessary for encrypting or decrypting information to be communicated between the first information processing apparatus and the second information processing apparatus. The first information processing apparatus further includes second reception means for receiving the data transmitted from the second information processing apparatus.

In the above-mentioned wireless communication system, the first transmission means transmits a wireless signal for computing a position of the first information processing apparatus to the second information processing apparatus in a UWB (Ultra Wide Band) manner, and the first reception means receives the wireless signal at a plurality of positions in a UWB manner.

In the above-mentioned wireless communication system, the first information processing apparatus further includes hash value generating means for generating a hash value of the data and display means for displaying the generated hash value. The second information processing apparatus further includes hash value generating means for generating a hash value of the data and display means for displaying the generated hash value.

In the above-mentioned wireless communication system, the first information processing apparatus further includes hash value generating means for generating a hash value of the data and display means for displaying an image that is identified by the hash value. The second information processing apparatus further includes hash value generating means for generating a hash value of the data and display means for displaying an image that is identified by the hash value.

In a wireless communication system according to an embodiment of the present invention, a wireless signal for computing a position of a first information processing apparatus is transmitted by the first information processing apparatus to a second information processing apparatus, the wireless signal transmitted from the first information processing apparatus is received by the second information processing apparatus at a plurality of positions, the position of the first information processing apparatus is computed on the basis of reception times of the wireless signal received at a plurality of positions, is it determined whether the computed position of the first information processing apparatus is inside a predetermined area. Data necessary for encrypting or decrypting information to be communicated with the first information processing apparatus is transmitted to the first information processing apparatus if the position of the first information processing apparatus is found inside the predetermined area, and the data transmitted from the second information processing apparatus is received by the first information processing apparatus.

According to an embodiment of the present invention, there is provided an information processing apparatus including: reception means for receiving a wireless signal transmitted from an opposite party, at a plurality of positions; computation means for computing a position of the opposite party on the basis of reception times of the wireless signal received at the plurality of positions; and determination means for determining whether the computed position of the opposite party is inside a predetermined area.

The above-mentioned information processing apparatus further includes transmission means for transmitting, if the position of the opposite party is found inside the predetermined area, data necessary for encrypting or decrypting information to be communicated between the information processing apparatus and the opposite party.

According to an embodiment of the present invention, there is provided an information processing method including the steps of: controlling reception of a wireless signal transmitted from an opposite party at a plurality positions; computing a position of the opposite party on the basis of reception times of the wireless signal received at the plurality of positions; and determining whether the computed position of the opposite party is inside a predetermined area.

According to an embodiment of the present invention, there is provided a recording medium recording a computer-readable program for making a computer execute the steps of: controlling reception of a wireless signal transmitted from an opposite party at a plurality positions; computing a position of the opposite party on the basis of reception times of the wireless signal received at the plurality of positions; and determining whether the computed position of the opposite party is inside a predetermined area.

According to an embodiment of the present invention, there is provided a program for making a computer execute the steps of: controlling reception of a wireless signal transmitted from an opposite party at a plurality positions; computing a position of the opposite party on the basis of reception times of the wireless signal received at the plurality of positions; and determining whether the computed position of the opposite party is inside a predetermined area.

In the information processing apparatus and method, recording medium, and program according to the invention, a wireless signal transmitted from an opposite party is received at a plurality of positions and the position of the opposite party is computed on the basis of the reception times of the wireless signal received at the plurality of positions, thereby determining whether the computed position of the opposite party is inside a predetermined area.

Communication as used herein denotes wireless communication, wired communication, or a combination thereof, namely, wireless in a certain section and wired in another section for example. In addition, the communication may be wired between certain apparatuses and wireless between other apparatuses, for example.

According to the present invention, masquerading by any third party may be prevented more surely than related-art technologies.

DETAILED DESCRIPTION OF THE PREFERRED EMBODIMENTS

Figure 1:
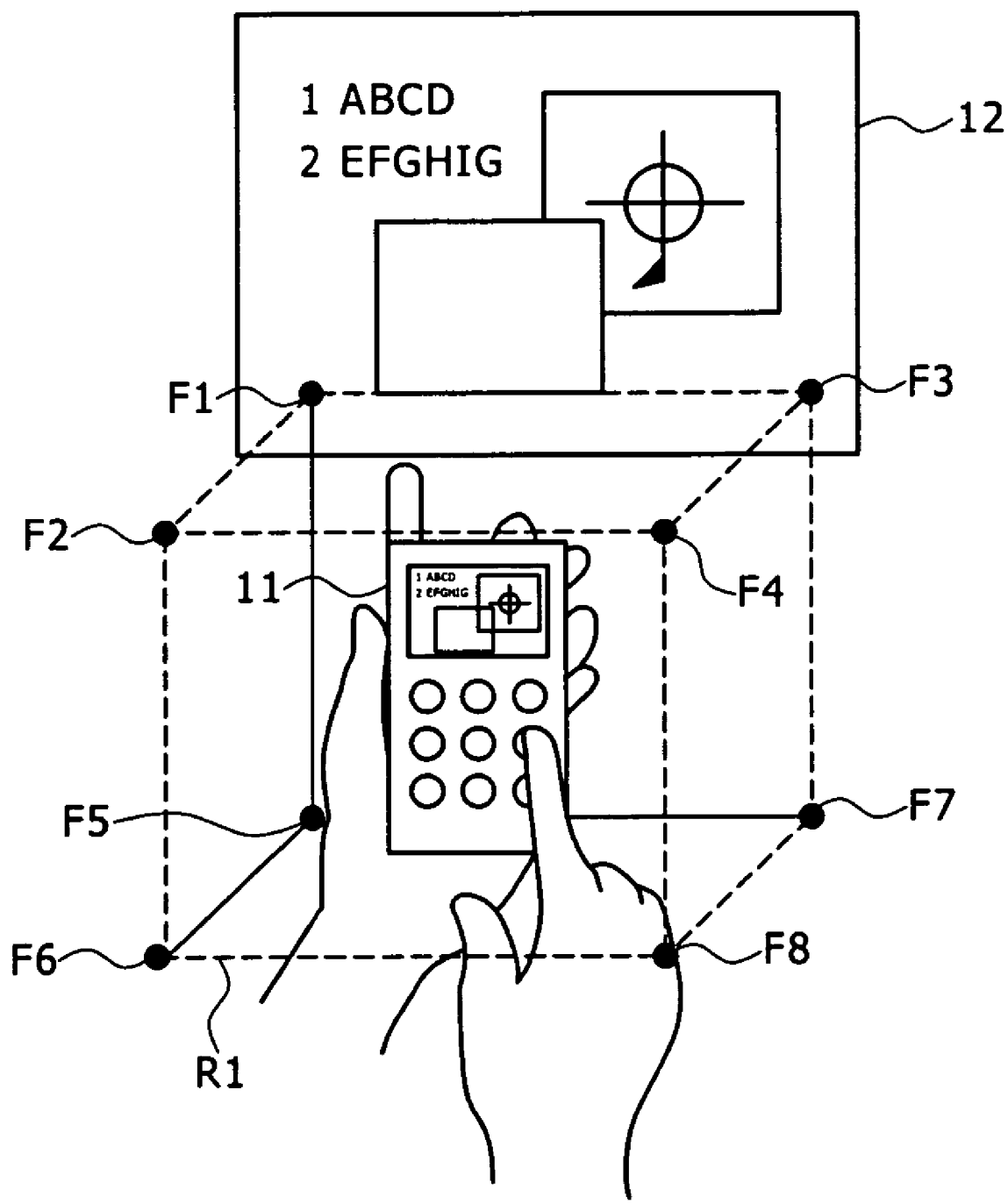
FIG. 1 is a schematic diagram illustrating a wireless communication system practiced as a first embodiment of the invention.

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

The wireless communication system has a first information processing apparatus (for example, a mobile phone 11 shown in FIG. 3) and a second information processing apparatus (for example, a PC 33 shown in FIG. 4) communicating with each other in a wireless manner. The first information processing apparatus includes first transmission means (for example, a antenna 54 for executing processing of step s54 shown in FIG. 7) for transmitting a wireless signal for computing a position of the first information processing apparatus to a second information processing apparatus. The second information processing apparatus includes: first reception means (for example, a receiver apparatus 31-1 to 31-4 shown in FIG. 2) for receiving the wireless signal transmitted from the first information processing apparatus at a plurality of positions; computation means (for example, a coordinate position computation block 124 shown in FIG. 4) for computing a position of the first information processing apparatus on the basis of reception times of the wireless signal received at the plurality of positions; determination means (for example, a determination block 153 shown in FIG. 4) for determining whether the computed position of the first information processing apparatus is inside a predetermined area; and second transmission means (for example, a sender apparatus 32 shown in FIG. 2) for transmitting, if the computed position of the first information processing apparatus is found inside the area, data necessary for encrypting or decrypting information to be communicated between the first information processing apparatus and the second information processing apparatus. The first information processing apparatus further includes second reception means (for example, the antenna 54 for executing processing of step S111 shown in FIG. 11) for receiving the data transmitted from the second information processing apparatus.

In the wireless communication system, the first transmission means (for example, the antenna 54 shown in FIG. 3) transmits a wireless signal for computing a position of the first information processing apparatus to the second information processing apparatus (for example, the PC 33 shown in FIG. 4) in a UWB (Ultra Wide Band) manner, and the first reception means (for example, a receiver apparatus 31-1 to 31-4 shown in FIG. 2) receives the wireless signal at a plurality of positions in a UWB manner.

In the wireless communication system, the first information processing apparatus (for example, a mobile phone 191 shown in FIG. 13) further includes hash value generating means (for example, a hash value generator block 229 shown in FIG. 13) for generating a hash value of the data and display means (for example, an output block 201 shown in FIG. 13) for displaying the generated hash value. The second information processing apparatus (for example, a PC 291 shown in FIG. 14) further includes hash value generating means (for example, a hash value generator block 318 shown in FIG. 14) for generating a hash value of the data and display means (for example, an output block 192 shown in FIG. 14) for displaying the generated hash value.

In the wireless communication system, the first information processing apparatus (for example, the mobile phone 191 shown in FIG. 13) further includes hash value generating means (for example, the hash value generator block 229 shown in FIG. 13) for generating a hash value of the data and display means (for example, the output block 201 shown in FIG. 13) for displaying an image that is identified by the hash value. The second information processing apparatus (for example, the PC 291 shown in FIG. 14) further includes hash value generating means (for example, the hash value generator block 318 shown in FIG. 14) for generating a hash value of the data and display means (for example, the output block 192 shown in FIG. 14) for displaying an image that is identified by the hash value.

Figure 4:
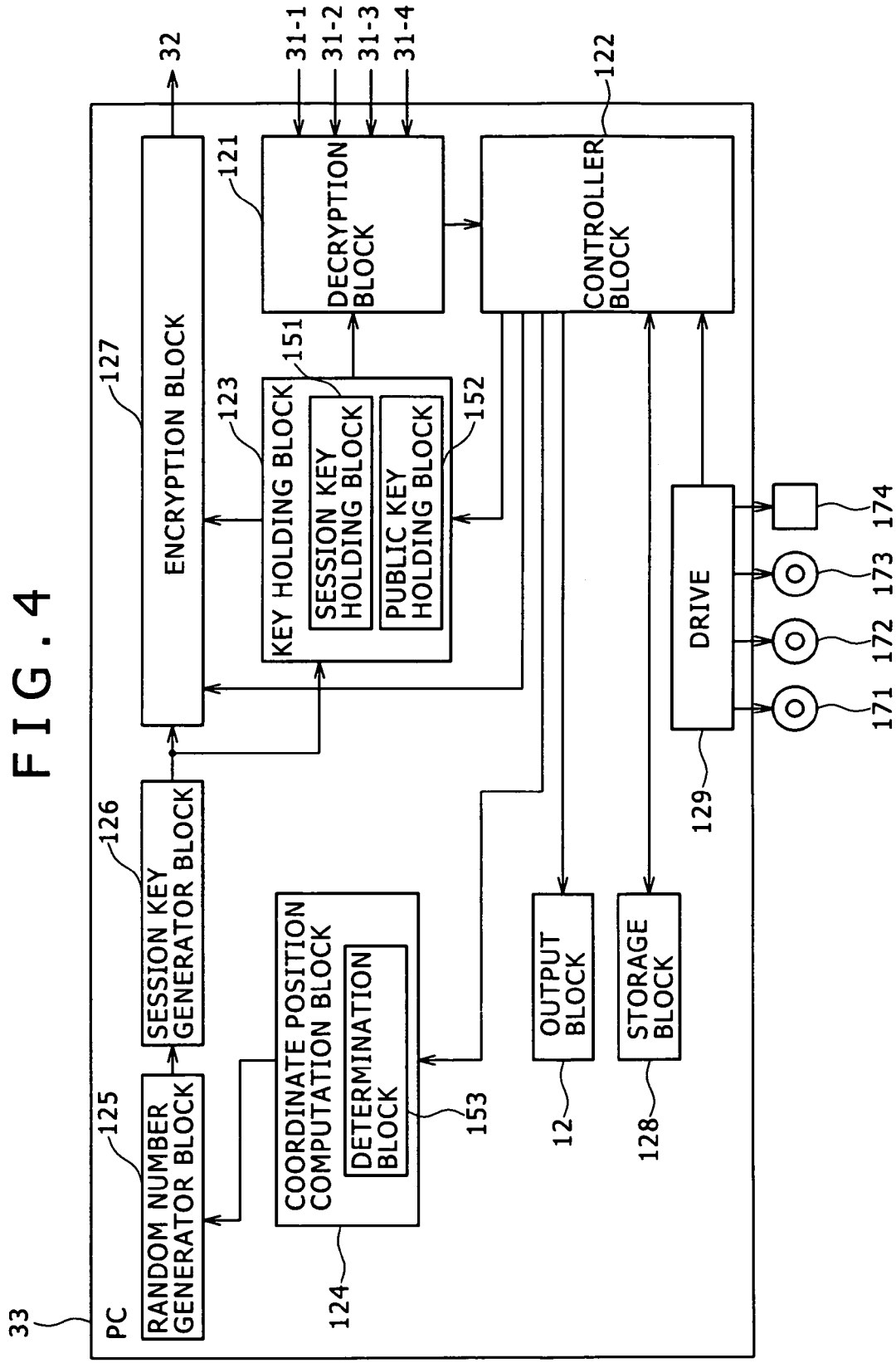
FIG. 4 is a block diagram illustrating an exemplary configuration of a PC (Personal Computer)

An information processing apparatus (for example, the PC 33 shown in FIG. 4) includes: reception means (for example, a receiver apparatus 31-1 to 31-4 shown in FIG. 2) for receiving a wireless signal transmitted from an opposite party, at a plurality of positions; computation means (for example, the coordinate position computation block 124 shown in FIG. 4) for computing a position of the opposite party on the basis of reception times of the wireless signal received at the plurality of positions; and determination means (for example, the determination block 153 shown in FIG. 4) for determining whether the computed position of the opposite party is inside a predetermined area.

The information processing apparatus (for example, the PC 33 shown in FIG. 4) further includes transmission means (for example, the sender apparatus 32 shown in FIG. 2) for transmitting, if the position of the opposite party is found inside the predetermined area, data necessary for encrypting or decrypting information to be communicated between the information processing apparatus and the opposite party.

Figure 5:
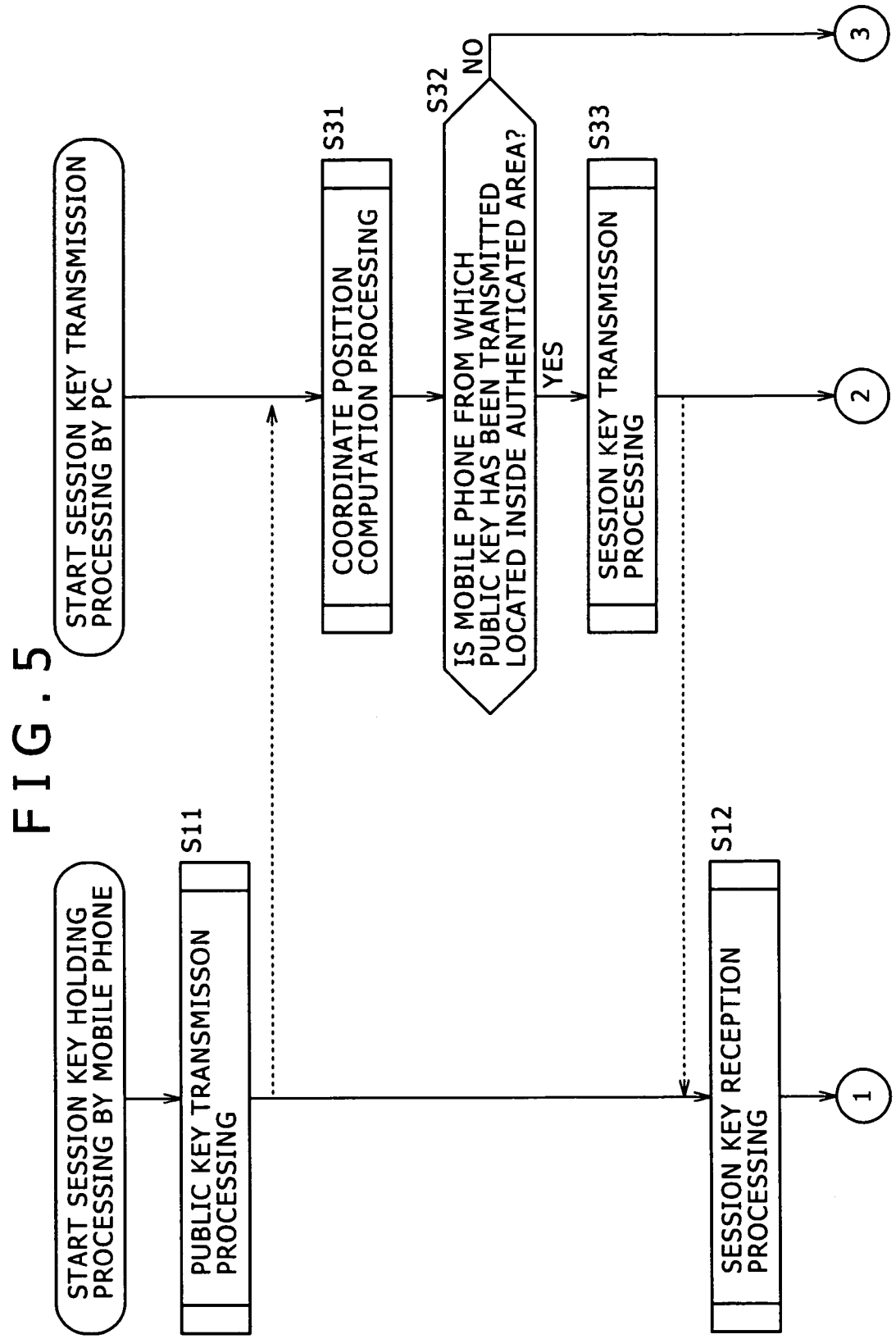
FIG. 5 is a flowchart indicative of session key holding processing by the mobile phone and session key transmission processing by the PC.

An information processing method includes the steps of: controlling reception of a wireless signal transmitted from an opposite party at a plurality positions (for example step S71 shown in FIG. 8); computing a position of the opposite party on the basis of reception times of the wireless signal received at the plurality of positions (for example, step S76 shown in FIG. 8); and determining whether the computed position of the opposite party is inside a predetermined area (for example, step S32 shown in FIG. 5).

It should be noted that the recording medium and the program are basically the same in processing as the above-mentioned information processing method recited above, so that the description of these recording medium and program will be skipped for the sake of brevity.

The present invention is applicable to wireless communication systems that execute user authentication, for example.

First, a first embodiment of the invention will be described.

Now, referring to FIG. 1, there is shown a wireless communication system practiced as the first embodiment of the invention. In this wireless communication system, a mobile phone 11 that is operated by the user and a PC (Personal Computer) that executes user authentication communicate with each other. The PC has an output block 12 that is a display monitor.

Area R1 that is a cuboid including vertices F1 through F8 is a predetermined authentication area. When the user operates the mobile phone 11 in authentication area R1 to execute authentication processing, the PC authenticates the user as an authorized user; on the other hand, if the user operates the mobile phone 11 outside authentication area R1, then the PC will not authenticate the user as an authorized user.

The PC receives a signal transmitted from the mobile phone 11 and determines the position of the mobile phone 11 on the basis of the received signal. If the position of the mobile phone 11 is found inside authentication area R1, then the PC authenticates the user of the mobile phone 11 as an authorized user; if the position of the mobile phone 11 is found outside authentication area R1, then the PC determines that the user is not an authorized user.

The output block 12, which is the display monitor of the of the PC, shows an image for example representative of the description of authentication processing. In this case, the user is able to operate the mobile phone 11 by referencing an image shown on the output block 12.

Figure 2:
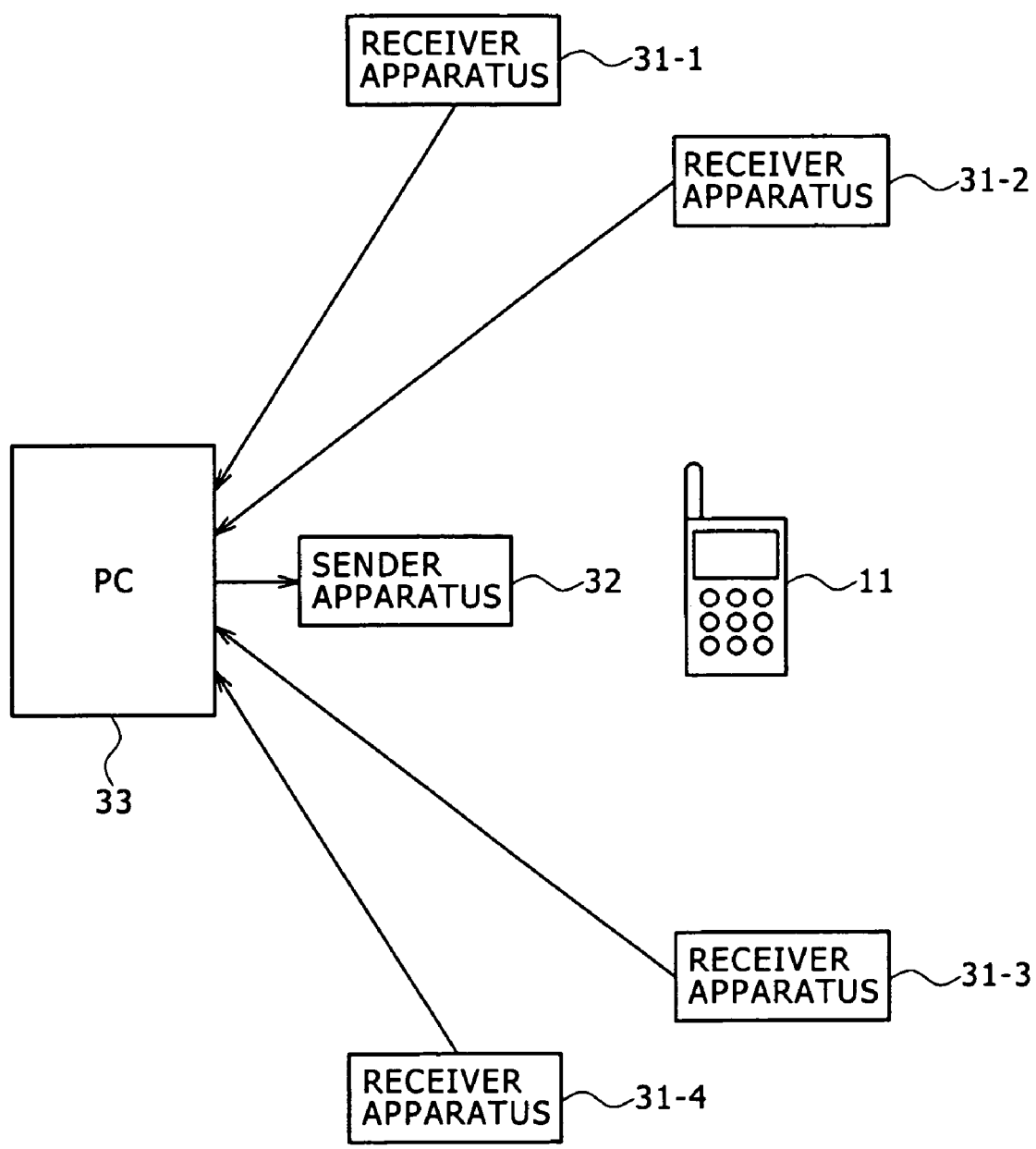
FIG. 2 is an exemplary configuration of the above-mentioned wireless communication system practiced as one embodiment of the invention.

Referring to FIG. 2, there is shown an exemplary configuration of the wireless communication system practiced as one embodiment of the invention.

In this wireless communication system, receiver apparatuses 31-1 through 31-4 and a sender apparatus 32 are connected to a PC 33 in a wired manner.

On the basis of a private key held in advance, the mobile phone 11 generates a public key and transmits the generated public key to the receiver apparatuses 31-1 through 31-4 by UWB (Ultra Wideband) communication. The mobile phone 11 modulates the generated public key by a predetermined algorithm and transmits the modulated public key to the receiver apparatuses 31-1 through 31-4 as an UWB signal that is a pulse signal.

A private key as used herein denotes a key held in the mobile phone 11 in advance. A private key is not made public. The data encrypted by a private key may be decrypted only by a public key generated on the basis of the private key. The data encrypted by a public key may be decrypted only by a private key.

Details of a private key and a public key will be described later. These private and public keys are those used in the RSA (Rivest-Shamir-Adelman) algorithm. In this case, each of the private key and the public key includes two integers. The private key includes two integers and the public key includes two integers generated on the basis of the two integers of the private key and a random number. One of the two integers of the private key is equal to (or the same as) one of the two integers of the public key.

Each of the receiver apparatuses 31-1 through 31-4 receives a public key transmitted from the mobile phone 11 and supplies, to the PC 33, the received public key and reception time information indicative of the time at which the public key has been received.

The receiver apparatus 31-1 receives a public key transmitted from the mobile phone 11 and supplies the received public key and the reception time information to the PC 33 and the receiver apparatus 31-2 receives the public key transmitted from the mobile phone 11 and supplies the received public key and the reception time information to the PC 33.

Likewise, the receiver apparatus 31-3 receives the public key transmitted from the mobile phone 11 and transmits the received public key and the reception time information to the PC 33 and the receiver apparatus 31-4 receives the public key transmitted from the mobile phone 11 and supplies the received public key and the reception time information to the PC 33.

It should be noted that the receiver apparatuses 31-1 through 31-4 are arranged in s suitably spaced manner without being clustered at one position.

In what follows, the receiver apparatuses 31-1 through 31-4 will be generically referred to as the receiver apparatus 31 unless otherwise noted.

On the basis of the reception time information received from the receiver apparatus 31, the PC 33 determines whether the position of the mobile phone 11 is positioned inside predetermined authentication area R1.

If the position of the mobile phone 11 is found inside predetermined authentication area R1, the PC 33 determines that the user of the mobile phone 11 is an authorized user and generates a session key. The PC 33 then encrypts the generated session key by the public key supplied from the receiver apparatus 31 and supplies the encrypted session key to the sender apparatus 32.

The session key herein denotes a common key that is used between the PC 33 and the mobile phone 11 and generated every time communication is made. The data encrypted by a session key may be decrypted only by the session key.

If the position of the mobile phone 11 is found outside predetermined authentication area R1, then the PC 33 generates no session key. In this case, because the position of the mobile phone 11 is not inside predetermined authentication area R1, the PC 33 determines that the user of the mobile phone 11 is not an authorized user, thereby ending the communication.

If the position of the mobile phone 11 is found inside predetermined authentication area R1, then the sender apparatus 32 transmits the session key received from the PC 33 to the mobile phone 11 by UWB communication.

The mobile phone 11 receives the session key transmitted from the sender apparatus 32 and decrypts the received session key by the private key held in advance. Next, by use of the session key received from the sender apparatus 32, the mobile phone 11 UWB-communicates with the PC 33. Therefore, for example, the mobile phone 11 encrypts a user ID for identifying the user and a signal for requesting the transmission of predetermined information by use of the session key and transmits the encrypted user ID and signal to the receiver apparatus 31 by UWB communication. Upon completion of the communication, the mobile phone 11 and the wiring discard the session keys held therein.

Consequently, if the mobile phone 11 wants to get predetermined image data from the PC 33 for example, the mobile phone 11 receives a session key generated by the PC 33 and transmitted by the sender apparatus 32. Then, the mobile phone 11 encrypts or decrypts the data to be transmitted or received by the session key to communicate the encrypted or decrypted data with the PC 33 until the image data is received from the PC 33. The mobile phone 11 encrypts the data to be transmitted to the receiver apparatus 31 by the session key and transmits the encrypted data to the receiver apparatus 31 by UWB communication. Also, the mobile phone 11 receives the data transmitted from the sender apparatus 32 and decrypts the received data by the session key.

The mobile phone 11 receives the image data transmitted from the sender apparatus 32 and, upon completion of the communication, discards the session key held herein. In order to newly communicate with the PC 33, the mobile phone 11 receives a session key newly generated by the PC 33 and transmitted from the sender apparatus 32. By use of the new received session key, the mobile phone 11 communicates with the PC 33.

Figure 3:
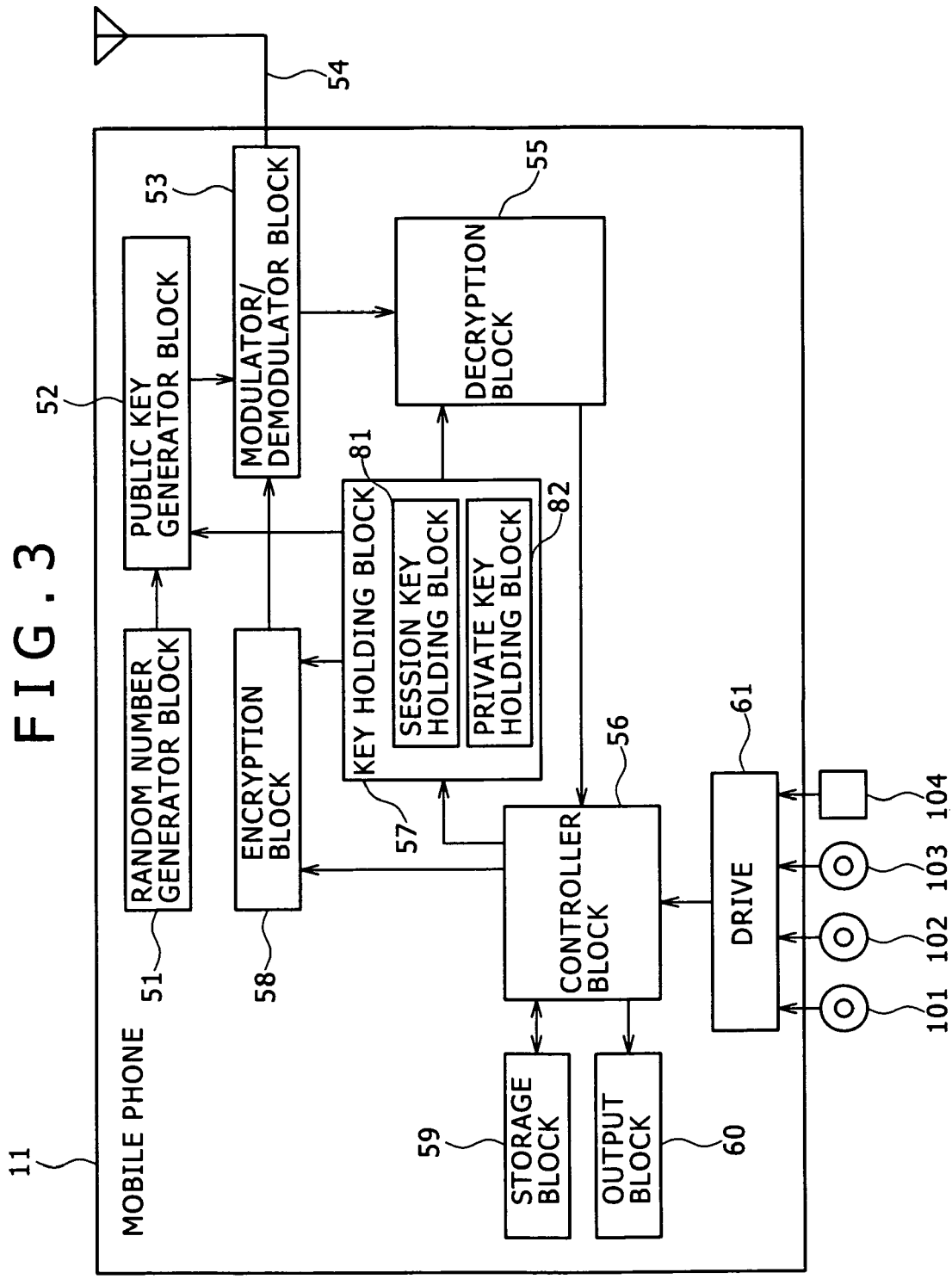
FIG. 3 is a block diagram illustrating a functional configuration of a mobile phone.

Referring to FIG. 3, there is shown in block diagram of a functional configuration of the mobile phone 11.

The mobile phone 11 has a random number generator block 51, a public key generator block 52, a modulator/demodulator block 53, an antenna 54, a decryption block 55, a controller block 56, a key holding block 57, an encryption block 58, a storage block 59, an output block 60, and a drive 61.

The random number generator block 51 generates random numbers and supplies them to the public key generator block 52.

The public key generator block 52 gets a private key from the key holding block 57. The public key generator block 52 generates a public key on the basis of the private key obtained from the key holding block 57 and the random number supplied from the random number generator 51 and supplies the generated public key to the modulator/demodulator block 53.

the modulator/demodulator block 53 modulates the public key supplied from the public key generator block 52 or the data supplied from the encryption block 58 by a predetermined scheme and supplies the modulated public key or data to the antenna 54. It should be noted that any of PPM (Pulse Position Modulation), PAM (Pulse Amplitude Modulation), and Bi-Phase modulation may be used for this modulation.

The modulator/demodulator block 53 demodulates the session key or data supplied from the antenna 54 by a scheme corresponding to the modulation scheme and supplies the demodulated session key or data to the decryption block 55.

The antenna 54 transmits the public key or data supplied from the modulator/demodulator block 53 to the receiver apparatus 31 by UWB communication. The antenna 54 receives the session key or data transmitted from the sender apparatus 32 and supplies the received session key or data to the modulator/demodulator block 53.

The decryption block 55 gets a private key held in the key holding block 57 and, on the basis of the obtained private key, decrypts the session key supplied from the modulator/demodulator block 53. The decryption block 55 supplies the decrypted session key to the controller block 56.

The decryption block 55 gets a session key held in the key holding block 57 and, on the basis of the obtained session key, decrypts the data supplied from the modulator/demodulator block 53. The decryption block 55 supplies the decrypted data to the controller block 56.

The controller block 56, made up of a built-in microprocessor or a system LSI (Large Scale Integration) chip, controls the mobile phone 11 in its entirety. The controller block 56 supplies the session key supplied from the decryption block 55 to the key holding block 57. Also, the controller block 56 supplies the data supplied from the decryption block 55 to the storage block 59 or the output block 60 as required.

The controller block 56 generates predetermined data (namely, a signal) in accordance with a command supplied from an input block (not shown) and supplies the generated data to the encryption block 58. For example, the controller block 56 generates a transmission request signal for requesting the transmission of predetermined image data in accordance with a command supplied from the input block and supplies the generated transmission request signal to the encryption block 58.

The controller block 56 reads a program from the drive 61 loaded as required and executes the program. Also, when a program or data is supplied from the drive 61, the controller block 56 supplies the supplied program or data to the storage block 59, reads the program from the storage block 59, and executes the program.

The key holding block 57, made up of a RAM (Random Access Memory) for example, holds a private key and a session key. The key holding block 57 has a session key holding block 81 and a private key holding block 82.

The session key holding block 81 of the key holding block 57 holds a session key supplied from the controller block 56. The key holding block 57 supplies the session key to the decryption block 55 and the encryption block 58.

The private key holding block 82 of the key holding block 57 holds a private key. The key holding block 57 supplies the private key to the public key generator block 52, the decryption block 55, and the encryption block 58.

The encryption block 58 gets a session key or a private key from the key holding block 57 as required and encrypts the data supplied from the controller block 56 by use of the obtained session key or private key. The encryption block 58 supplies the encrypted data to the modulator/demodulator block 53.

The storage block 59, made up of a hard disk drive or a nonvolatile semiconductor memory for example, stores various kinds of data. The storage block 59 records the data supplied from the controller block 56. Also, the storage block 59 supplies the stored data to the controller block 56 as required.

The output block 60, made up of a display monitor, a speaker, and/or indicators for example, outputs the data supplied from the controller block 56. For example, if the output block 60 is a display monitor, the output block 60 displays an image on the basis of the image data supplied from the controller block 56.

The drive 61 drives a magnetic disk 101, an optical disk 102, a magneto-optical disk 103, or a semiconductor memory 104 loaded thereon, thereby reading programs and data from the loaded recording medium. The obtained programs and data are transferred to the controller block 56.

Referring to FIG. 4, there is shown a block diagram of a functional configuration of the PC 33.

The PC 33 has the output block 12, a decryption block 121, a controller block 122, a key holding block 123, a coordinate position computation block 124, a random number generator block 125, a session key generator block 126, an encryption block 127, a storage block 128, and a drive 129.

The decryption block 121 controls the reception of a public key or data transmitted from the mobile phone 11 to supply the public key and reception time information received from the receiver apparatus 31 to the controller block 122. The decryption block 121 gets a session key or a public key from the key holding block 123 as required and decrypts the data received from the receiver apparatus 31 by use of the obtained session key or public key. The decryption block 121 supplies the decrypted data to the controller block 122.

The controller block 122, made up of a built-in microprocessor or a system LSI for example, controls the PC 33 in its entirety. The controller block 122 supplies a public key received from the decryption block 121 to the key holding block 123. The controller block 122 supplies the reception time information received from the decryption block 121 to the coordinate position computation block 124.

the controller block 122 supplies the data received from the decryption block 121 to the storage block 128 or the output block 12 as required.

The controller block 122 gets predetermined data from the storage block 128 as required and supplies the obtained data to the encryption block 127. For example, when a transmission request signal, transmitted from the mobile phone 11, requesting the transmission of image data has been supplied from the decryption block 121, the controller block 122 gets the image data from the storage block 128 and supplies the obtained image data to the encryption block 127.

The controller block 122 reads a program from the recording medium loaded on the drive 129 as required and executes the program. Also, when a program or data is supplied from the drive 129, the controller block 122 supplies the supplied program or data to the storage block 128 as required and reads the program or data therefrom to execute the program.

The key holding block 123, made up of a memory such as RAM for example, stores a session key and a public key. The key holding block 123 has a session key holding block 151 and a public key holding block 152.

The session key holding block 151 of the key holding block 123 stores a session key supplied from the session key holding block 126. The key holding block 123 supplies the received session key to the decryption block 121 and the encryption block 127.

The public key holding block 152 of the key holding block 123 stores a public key supplied from the controller block 122. The key holding block 123 supplies the public key to the decryption block 121 and the encryption block 127.

The coordinate position computation block 124 computes a coordinate position, which is a current position of the mobile phone 11, on the basis of the reception time information supplied from the controller block 122. For example, the coordinate position computation block 124 obtains a distance between the receiver apparatus 31 and the mobile phone 11 on the basis of each reception time included in each of a plurality of reception time information supplied from the controller block 122, thereby computing the coordinate position of the mobile phone 11. The coordinate position of the mobile phone 11 denotes herein the position (or coordinates) of the mobile phone 11 in a predetermined coordinate system. Details of this coordinate position will be described later.

The coordinate position computation block 124 has a determination block 153. The determination block 153 of the coordinate position computation block 124 determines whether the mobile phone 11 is positioned inside predetermined authentication area R1 on the basis of the coordinate position of the mobile phone 11 computed by the coordinate position computation block 124. To be more specific, the determination block 153 of the coordinate position computation block 124 stores the data for identifying authentication area R1 in advance and determines whether the mobile phone 11 is positioned inside predetermined authentication area R1 on the basis of the data for identifying stored authentication area R1 and the coordinate position of the mobile phone 11 computed by the coordinate position computation block 124.

If the mobile phone 11 is determined to be inside predetermined authentication area R1, then the coordinate position computation block 124 generates a generation request signal for generating a session key and supplies this signal to the random number generator block 125.

If the mobile phone 11 is determined to be outside predetermined authentication area R1, then the coordinate position computation block 124 will not generate a generation request signal for generating a session key.

When the generation request signal has come from the coordinate position computation block 124, the random number generator block 125 generates a random number and supplies the generated random number to the session key holding block 126.

The session key holding block 126 generates a session key on the basis of the random number supplied from the random number generator block 125 and supplies the generated session key to the key holding block 123 and the encryption block 127.

For example, the session key holding block 126 generates a 56-bit session key for use in DES (Data Encryption Standard) on the basis of the random number supplied from the random number generator block 125 and supplies the generated session key to the key holding block 123 and the encryption block 127.

The encryption block 127 gets a public key from the key holding block 123 and, by use of the obtained public key, encrypts a session key supplied from the session key holding block 126. The encryption block 127 supplies the encrypted session key to the sender apparatus 32. Also, the encryption block 127 gets a session key or a public key from the key holding block 123 and encrypts the data supplied from the controller block 122 by use of the obtained session key or public key. The encryption block 127 supplies the encrypted data to the sender apparatus 32, controlling the transmission of the data or the session key supplied to the sender apparatus 32 to the mobile phone 11.

The storage block 128, made up of a hard disk drive or a nonvolatile semiconductor memory for example, stores various kinds of data. The storage block 128 records data supplied from the controller block 122. Also, the storage block 128 supplies the recorded data to the controller block 122 as required.

The output block 12, made up of a display monitor, a speaker, and/or indicators for example, outputs the data supplied from the controller block 122. For example, the output block 12, which is a display monitor, displays an image on the basis of the image data supplied from the controller block 122.

The drive 129 drives a magnetic disk 171, an optical disk 172, a magneto-optical disk 173, or a semiconductor memory 174 loaded thereon, thereby reading programs and data from the loaded recording medium. The obtained programs and data are transferred to the controller block 122.

Figure 6:
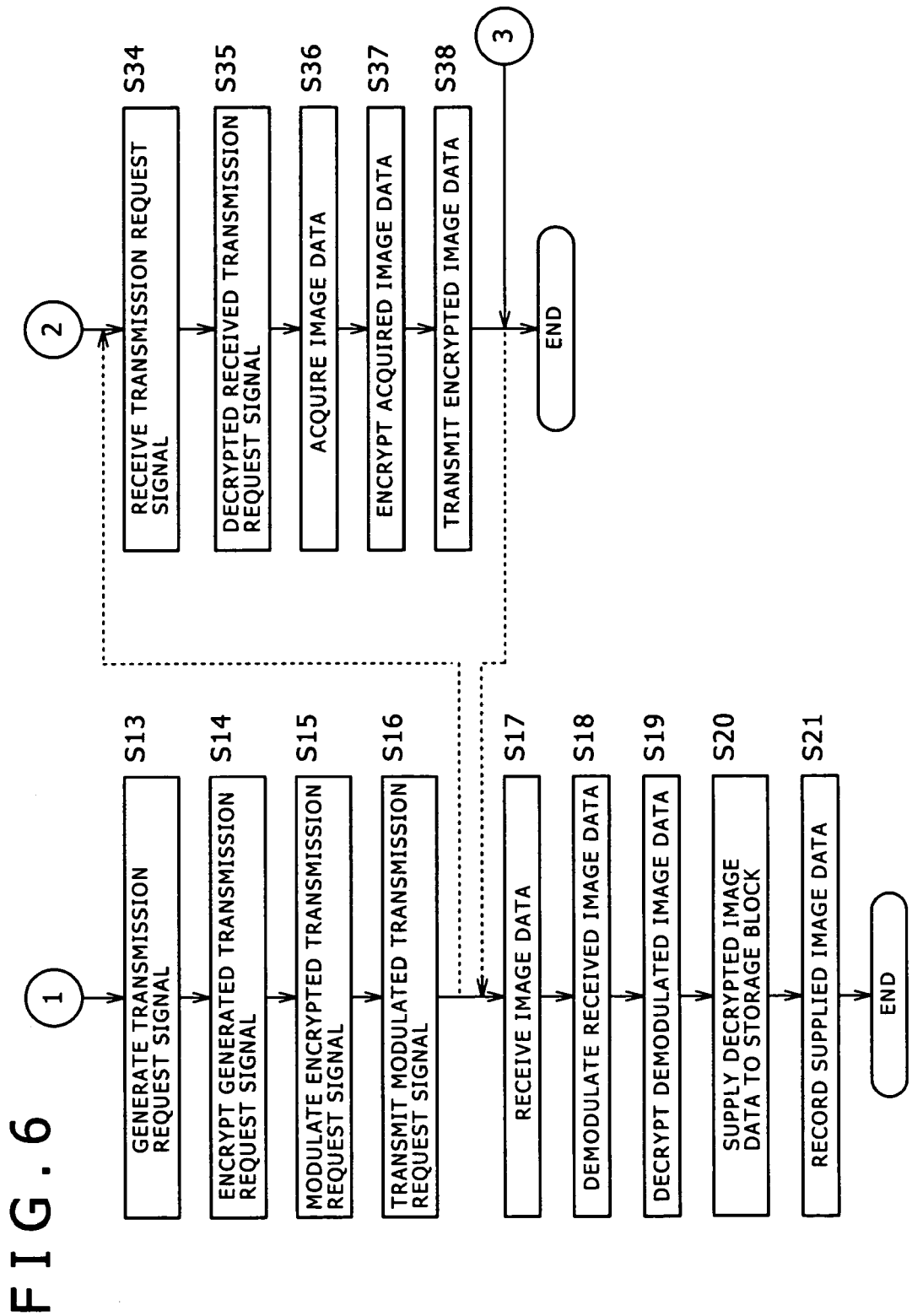
FIG. 6 is a flowchart indicative continued from the flowchart shown in FIG. 5.

The following describes the session key holding processing by the mobile phone 11 and the session key transmission processing by the PC 33 with reference to the flowcharts shown in FIGS. 5 and 6.

In step S11, the mobile phone 11 executes public key transmission processing. It should be noted that details of the public key transmission processing will be described later; in the processing of public key transmission, the mobile phone 11 generates a public key on the basis of a private key held in advance in order to communication with the PC 33. The mobile phone 11 transmits the generated public key to the receiver apparatus 31 by UWB communication.

The public key transmitted by the mobile phone 11 is received by the receiver apparatus 31 under the control of the decryption block 121. Receiving the public key transmitted from the mobile phone 11, the receiver apparatus 31 generates reception time information indicative of the time at which the public key has been received. Then, the receiver apparatus 31 supplies the received public key and the generated reception time information to the PC 33.

With the public key and the reception time information supplied from the receiver apparatus 31, the coordinate position computation block 124 executes the processing of coordinate position computation in step S31. It should be noted that details of the processing of coordinate position computation will be described later; in the processing of coordinate position computation, the coordinate position computation block 124 obtains a distance between the receiver apparatus 31 and the mobile phone 11 on the basis of the reception time included in the reception time information supplied from the receiver apparatus 31, thereby computing the coordinate position of the mobile phone 11.

In step S32, the determination block 153 of the coordinate position computation block 124 determines on the basis of the coordinate position of the mobile phone 11 computed by the coordinate position computation block 124 whether the mobile phone 11 that has transmitted the public key is positioned inside predetermined authentication area R1.

To be more specific, in step S32, the determination block 153 of the coordinate position computation block 124 determines whether the mobile phone 11 that has transmitted the public key is positioned inside predetermined authentication area R1 on the basis of the stored data for identifying authentication area R1 and the coordinate position of the mobile phone 11 computed by the coordinate position computation block 124.

It should be noted that the number of authentication areas R1 and positions thereof may be easily changed by updating the data for identifying authentication area R1 stored in the determination block 153 of the coordinate position computation block 124.

If the mobile phone 11 is found positioned inside authentication area R1 in step S32, it indicates that the mobile phone 11 has been authenticated to be the mobile phone 11 that is operated by the authorized user, so that the procedure goes to step S33, in which the PC 33 executes session key transmission processing. It should be noted that details of the session key transmission processing will be described later; in the session key transmission processing, the PC 33 generates a session key and encrypts the generated session key by use of a public key supplied from the receiver apparatus 31. The PC 33 then transmits the encrypted session key to the sender apparatus 32.

Under the control of the encryption block 127, the sender apparatus 32 transmits the session key supplied from the PC 33 to the mobile phone 11 by UWB communication.

Because the session key has been transmitted from the sender apparatus 32, the mobile phone 11 executes session key reception processing in step S12. It should be noted that details of the session key reception processing will be described later; in the session key reception processing, the mobile phone 11 receives the session key from the sender apparatus 32 and decrypts the received session key by use of the private key. Then, the mobile phone 11 holds the decrypted session key.

When the mobile phone 11 has received the session key, the mobile phone 11 and the PC 33 encrypts or decrypts the data to be transmitted or received and communicates the encrypted or decrypted data. The following describes the processing of requesting the transmission of predetermined image data from the mobile phone 11 to the PC 33, by way of example.

In step S13, the controller block 56 generates a transmission request signal for transmitting predetermined image data and supplies the generated signal to the encryption block 58.

In step S14, the encryption block 58 encrypts the transmission request signal supplied from the controller block 56 and supplies the encrypted signal to the modulator/demodulator block 53. For example, in step S14, the encryption block 58 gets a session key from the key holding block 57 and encrypts the transmission request signal supplied from the controller block 56, by use of the obtained session key. Then, the encryption block 58 supplies the encrypted transmission request signal to the modulator/demodulator block 53.

In step S15, the modulator/demodulator block 53 modulates the transmission request signal supplied from the encryption block 58 by a predetermined modulation scheme and supplies the modulated signal to the antenna 54. For example, in step S15, the modulator/demodulator block 53 modulates the transmission request signal supplied from the encryption block 58 by PPM, PAM, or B-Phase modulation scheme for example and supplies the modulated signal to the antenna 54.

In step S16, the antenna 54 radiates the transmission request signal supplied from the modulator/demodulator block 53 as a UWB signal, which is a pulse signal, thereby transmitting the signal to the receiver apparatus 31.

In step S34, the receiver apparatus 31 receives the transmission request signal from the mobile phone 11 under the control of the decryption block 121 and supplies the received signal to the decryption block 121.

In step S35, the decryption block 121 decrypts the transmission request signal supplied from the receiver apparatus 31 and supplies the decrypted signal to the controller block 122. For example, in step S35, the decryption block 121 gets a session key from the key holding block 123 and decrypts the transmission request signal supplied from the receiver apparatus 31 by use of the obtained session key. Then, the decryption block 121 supplies the decrypted transmission request signal to the controller block 122.

Because the transmission request signal for requesting the transmission of image data has been supplied from the decryption block 121, the controller block 122 gets the requested image data from the storage block 128 and supplies the obtained image data to the encryption block 127 in step S36.

In step S37, the encryption block 127 encrypts the image data supplied from the controller block 122 and supplies the encrypted image data to the sender apparatus 32. For example, in step S37, the encryption block 127 gets a session key from the key holding block 123 and encrypts the image data supplied from the controller block 122 by use of the obtained session key. The encryption block 127 then supplies the encrypted image data to the sender apparatus 32.

In step S38, the sender apparatus 32 modulates the image data supplied from the encryption block 127 in the same modulation scheme as that of the modulator/demodulator block 53 under the control of the encryption block 127. Then, the sender apparatus 32 transmits the modulated image data to the mobile phone 11 as a UWB signal, upon which the session key transmission processing ends.

On the other hand, if the mobile phone 11 is found positioned not inside authentication area R1 in step S32, it indicates that the mobile phone 11 is not the mobile phone 11 that is operated by an authorized user, so that steps S33 through S38 will be skipped, upon which the session key transmission processing ends.

Because the image data has been transmitted from the sender apparatus 32, the antenna 54 receives the image data in step S17 and transmits the received image data to the modulator/demodulator block 53.

In step S18, the modulator/demodulator block 53 demodulates the image data supplied from the antenna 54 by the demodulation scheme corresponding to that of the modulator/demodulator block 53 and supplies the demodulated image data to the decryption block 55.

In step S19, the decryption block 55 decrypts the image data supplied from the modulator/demodulator block 53 and supplies the decrypted image data to the controller block 56. For example, in step S19, the decryption block 55 gets a session key from the key holding block 57 and decrypts the image data supplied from the modulator/demodulator block 53 by use of the obtained session key. Then, the decryption block 55 supplies the decrypted image data to the controller block 56.

In step S20, the controller block 56 supplies the image data received from the decryption block 55 to the storage block 59.

In step S21, the storage block 59 records the image data supplied from the controller block 56, upon which the session key holding processing ends. When the communication has come to an end, the mobile phone 11 and the PC 33 discard the session keys held therein.

Thus, the mobile phone 11 generates a public key and transmits the generated public to the receiver apparatus 31 by UWB communication. Then, the mobile phone 11 receives a session key transmitted from the sender apparatus 32 and holds the received session key.

The PC 33 obtains a distance from the receiver apparatus 31 to the mobile phone 11 on the basis of the reception time information supplied from the receiver apparatus 31 to compute the coordinate position, which is the position of the mobile phone 11 in a predetermined coordinate system. Then, the PC 33 determines whether the mobile phone 11 is positioned inside authentication area R1 on the basis of the computed coordinate position. If the mobile phone 11 is found positioned inside authentication area R1, the PC 33 generates a session key and supplies the generated session key to the sender apparatus 32. For example, if UWB is used, the coordinate position is computed with an error of about several centimeters.

It should be noted that, if the user operating the mobile phone 11 is found to be an authorized user, then the subsequent communication may be carried out by a communication scheme other than UWB. In the above-mentioned example, the PC 33 transmits image data to the mobile phone 11; it is also practicable to transmit predetermined information or audio data in addition to image data.

Thus, the PC 33 computes the coordinate position of the mobile phone 11 on the basis of the reception time information indicative of the time at which a public key transmitted from the mobile phone 11 has been received from the receiver apparatus 31, so that the position of the mobile phone 11 can be obtained more correctly, thereby foiling masquerading attempts.

Also, the PC 33 computes the coordinate position of the mobile phone 11 and determines the authenticated user based on whether the mobile phone 11 is at a specific position on the basis of the computed coordinate position, so that any number of authentication areas R1 may be arranged at any positions.

Figure 7:
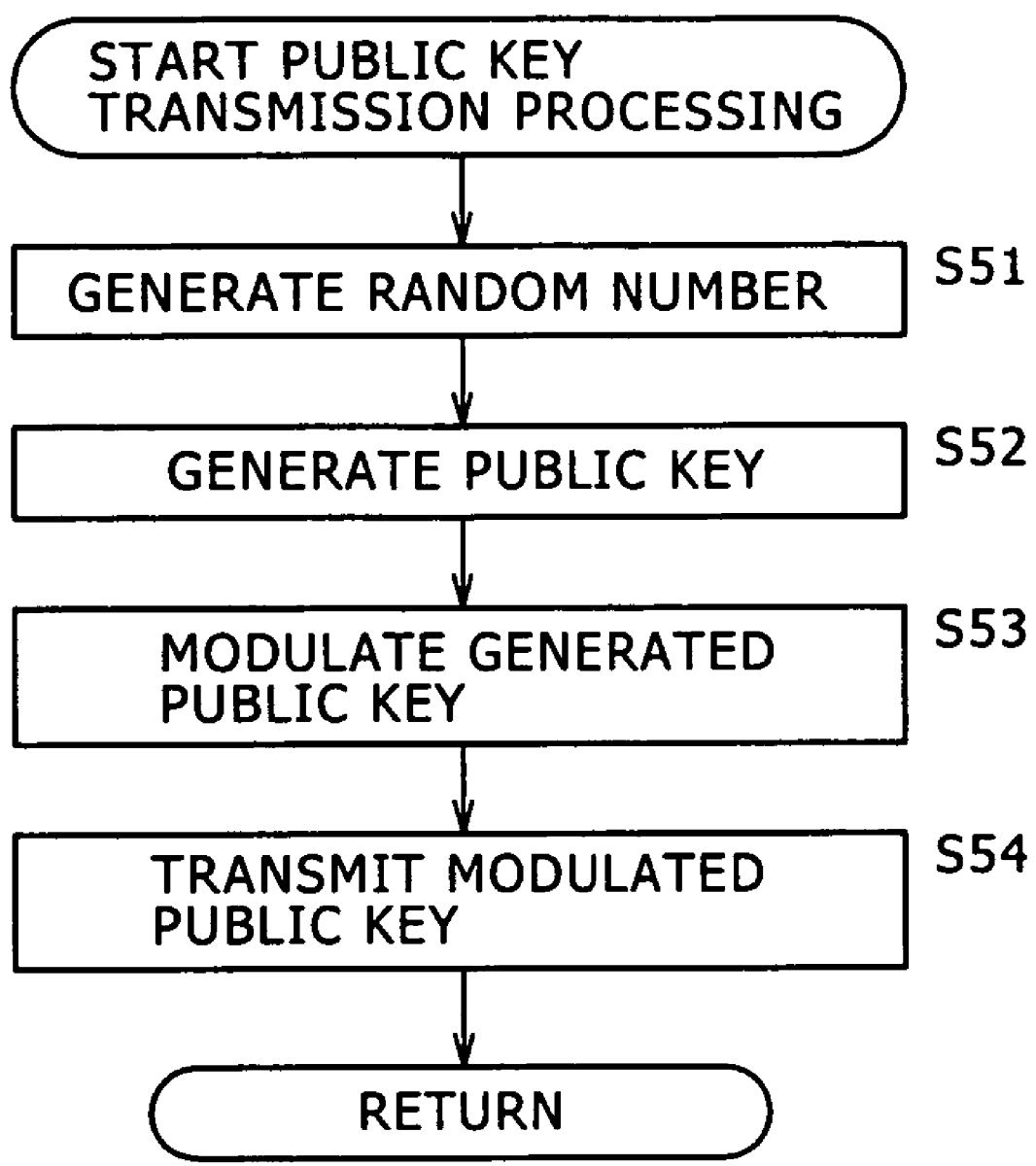
FIG. 7 is a flowchart indicative of public key transmission processing.

The following describes public key transmission processing corresponding to the processing of step S11 shown in FIG. 5 with reference to a flowchart shown in FIG. 7.

In step S51, the random number generator 51 generates a random number and supplies the generated random number to the public key generator block 52.

In step S52, the public key generator block 52 generates a public key and transmits the generated public key to the modulator/demodulator block 53. For example, in step S52, the public key generator block 52 gets a private key including two integers for use in the RSA scheme from the key holding block 57, generates a public key including two integers on the basis of the obtained private key and the random number supplied from the random number generator 51, and supplies the generated public key to the modulator/demodulator block 53.

In step S53, the modulator/demodulator block 53 modulates the public key supplied from the public key generator block 52 by a modulation scheme such as PPM, PAM, or Bi-Phase and supplies the modulated public key to the antenna 54.

In step S54, the antenna 54 transmits the public key supplied from the modulator/demodulator block 53 by radiating the public key as a UWB signal, which is a pulse signal, to the receiver apparatus 31, upon which the public key transmission processing ends.

Thus, the mobile phone 11 generates a public key and transmits the generated public key to the receiver apparatus 31.

Transmitting a public key to the receiver apparatus 31 as described above allows the encryption and decryption of data by use of a public key and a private key so as to prevent a session key from being stolen by a third party, thereby foiling masquerading attempts.

Figure 8:
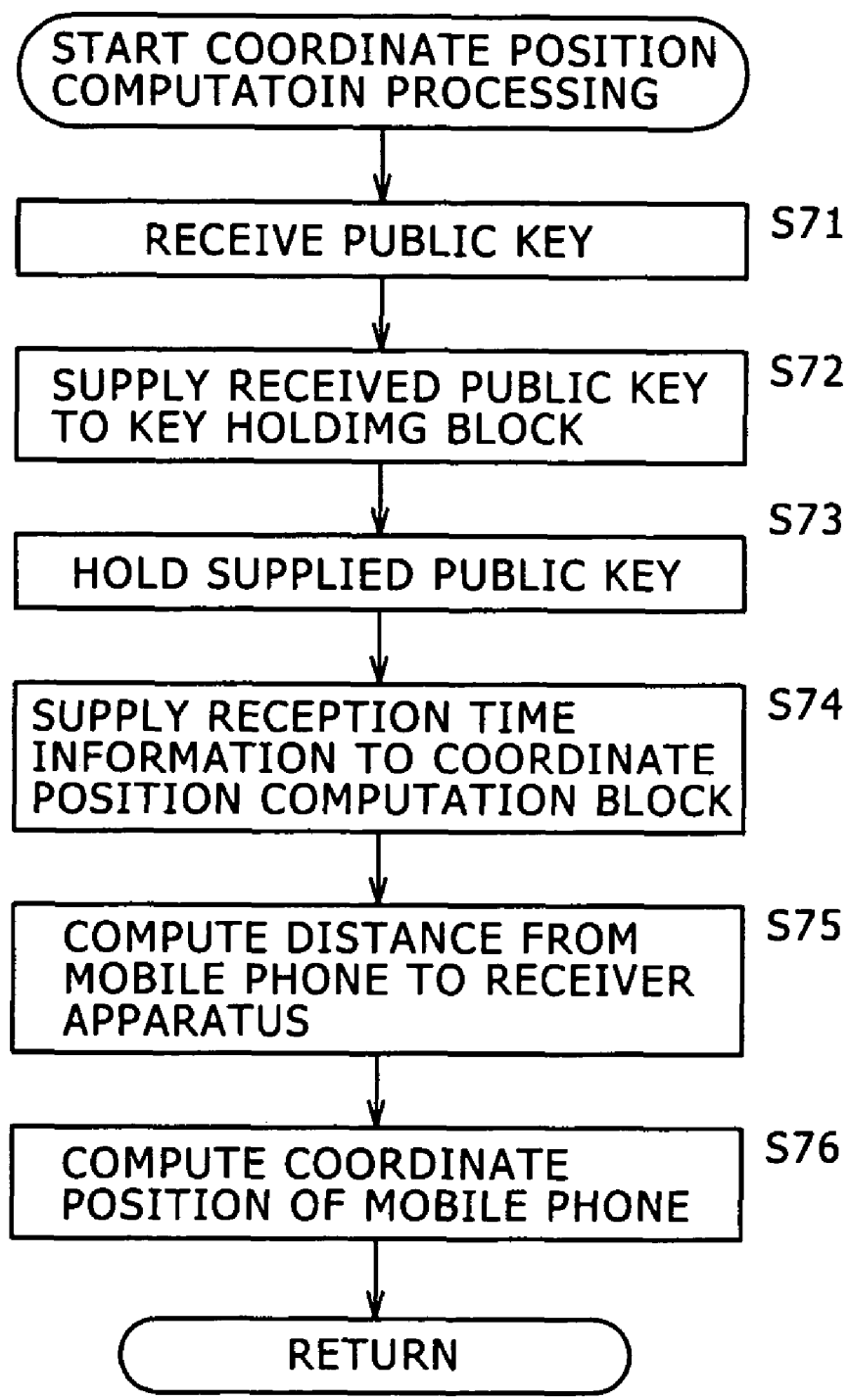
FIG. 8 is a flowchart indicative of coordinate position computation processing.

The following describes coordinate position computation processing corresponding to the processing of step S31 shown in FIG. 5 with reference to a flowchart shown in FIG. 8.

In step S71, the receiver apparatus 31 receives a public key transmitted from the mobile phone 11 under the control of the decryption block 121. Then, the receiver apparatus 31 generates reception time information indicative of the time at which the public key has been received and supplies the generated reception time information and the received public key to the decryption block 121. The decryption block 121 supplies the public key and the reception time information supplied from the receiver apparatus 31 to the controller block 122.

For example, the receiver apparatus 31 incorporates a realtime clock. The PC 33 synchronizes the realtime clock of the receiver apparatus 31. By doing so, the PC 33 is able to get the reception time information including the synchronized reception time, thereby computing the position of the mobile phone 11 more accurately.

In step S72, the controller block 122 supplies the public key received from the decryption block 121 to the key holding block 123.

In step S73, the public key holding block 152 of the key holding block 123 holds the public key supplied from the controller block 122.

In step S74, the controller block 122 supplies the reception time information received from the decryption block 121 to the coordinate position computation block 124.

In step S75, the coordinate position computation block 124 computes a distance from the receiver apparatus 31 to the mobile phone 11 on the basis of the reception time information supplied from the controller block 122. For example, the coordinate position computation block 124 computes the distance from the receiver apparatus 31 to the mobile phone 11 with reference to the position of the receiver apparatus 31 as shown in FIG. 9.

Figure 9:
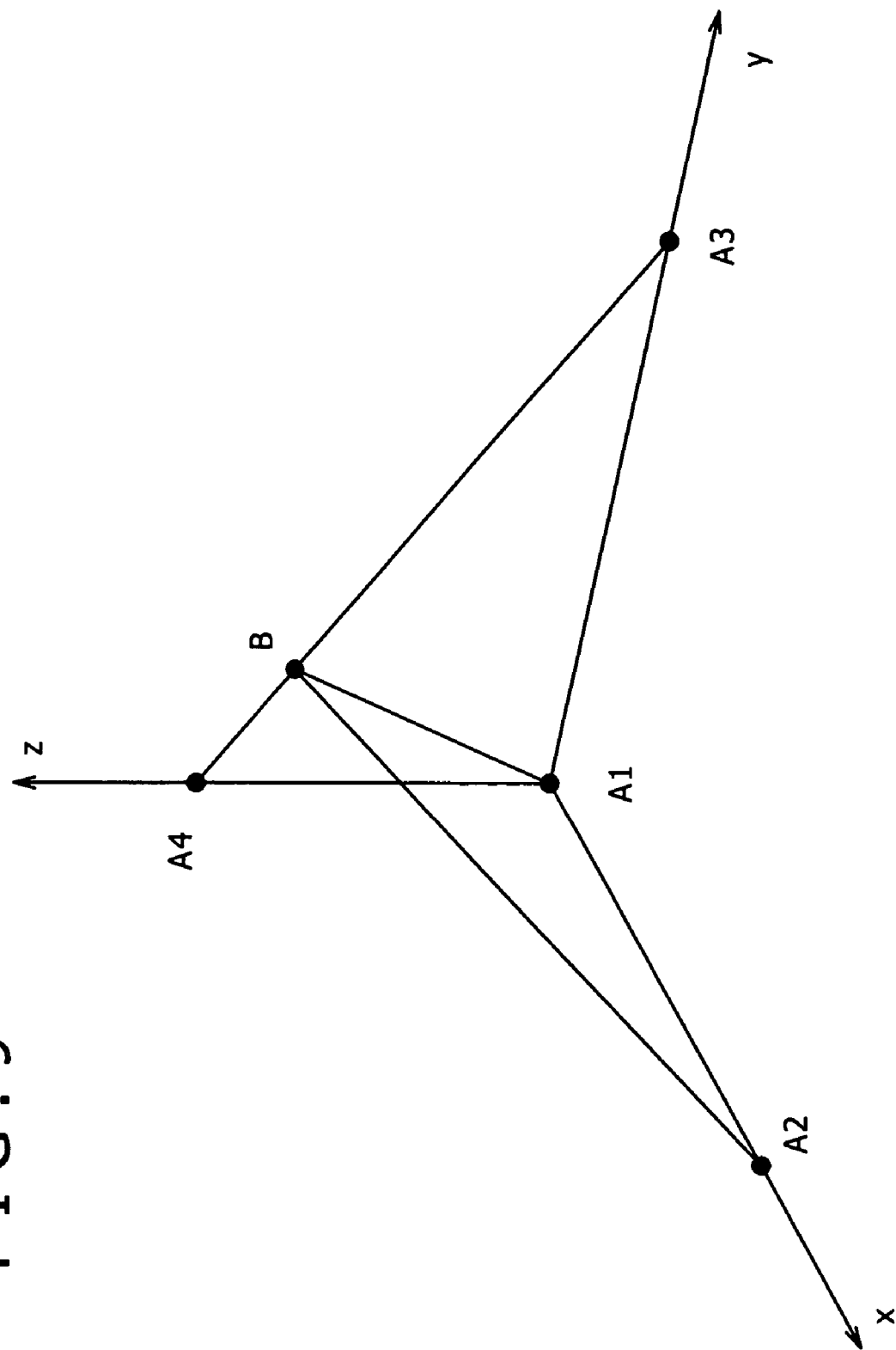
FIG. 9 is a diagram illustrating coordinate positions.

Referring to FIG. 9, point A1 indicates the position of the receiver apparatus 31-1 in a coordinate system having axes in x, y, and z directions with reference to point A1. The coordinate (or the coordinate position) of point A1 is represented in (0, 0, 0) because x, y, and z coordinates of point A1 are 0s.

Likewise, point A2 indicates the position of the receiver apparatus 31-2 in a coordinate system having axes x, y, and z directions with reference to point A1, point A3 indicates the position of the receiver apparatus 31-3, and point A4 indicates the position of the receiver apparatus 31-4.

Because x coordinate of point A2 is 1, y coordinate is 0, and z coordinate is 0, the coordinate of point A2 is represented in (1, 0, 0); because x coordinate of point A3 is 0, y coordinate is 1, and z coordinate is 0, the coordinate of point A3 is represented in (0, 1, 0). Likewise, because x coordinate of point A4 is 0, y coordinate is 0, and z coordinate is 1, the coordinate of point A4 is represented in (0, 0, 1).

Point B indicates the position of the mobile phone 11. Now, let the coordinate of point B be (x, y, z) and a distance between point A1 and point B be r1, a distance between point A2 and point B be r2, a distance between point A3 and point B be r3, and a distance between point A4 and point B be r4, thereby computing r1, r2, r3, and r4 as follows:

A sphere having radius r1 with point A1 being the center thereof is expressed in equation (1) below.

$$x^2+y^2+z^2=(r1)^2 \quad (1)$$

Likewise, a sphere having radius r2 with point A2 being the center thereof is expressed in equation (2) below, a sphere having radius r3 with point A3 being the center thereof is expressed in equation (3) below, and a sphere having radius r4 with point A4 being the center thereof is expressed in equation (4) below.

$$(x-1)^2+y^2+z^2=(r2)^2 \quad (2)$$

$$x^2+(y-1)^2+z^2=(r3)^2 \quad (3)$$

$$x^2+y^2+(z-1)^2=(r4)^2 \quad (4)$$

From equations (1), (2), (3), and (4) above, equations (5), (6), and (7) are obtained. Equations (5), (6), and (7) indicate x coordinate, y coordinate, and z coordinate of point B indicative of the position of the mobile phone 11, respectively.

$$x=(1+(r1)^2-(r2)^2)/2 \quad (5)$$

$$y=(1+(r1)^2-(r3)^2)/2 \quad (6)$$

$$z=(1+(r1)^2-(r4)^2)/2 \quad (7)$$

Now, let the time at which the mobile phone 11 has transmitted the UWB signal be t0, the velocity of the UWB signal be v, and the time at which the receiver apparatus 31-1 has received the UWB transmitted from the mobile phone 11 be t1, then distance r1 between point A1 and point B is expressed by equation (8) below. In this equation, velocity v of UWB signal is a predetermined constant.

$$r1=v(t1-t0) \quad (8)$$

Likewise, let the time at which the receiver apparatus 31-2 has received the UWB signal transmitted from the mobile phone 11 be t2, then distance r2 between point A2 and point B is expressed by equation (9) below; let the time at which the receiver apparatus 31-3 has received the UWB signal transmitted from the mobile phone 11 be t3, then distance r3 between point A3 and point B is expressed by equation (10) below; and let the time at which the receiver apparatus 31-4 has received the UWB signal transmitted from the mobile phone 11 be t4, then distance r4 between point A4 and point B is expressed by equation (11) below.

$$r2=v(t2-t0) \quad (9)$$

$$r3=v(t3-t0) \quad (10)$$

$$r4=v(t4-t0) \quad (11)$$

Here, getting a difference between equation (8) and equation (9) gets equation (12), getting a difference between equation (8) and equation (10) gets equation (13), and getting a difference between equation (8) and equation (11) gets equation (14). Thus, getting a difference between reception times eliminates transmission time t0 from each equation. Therefore, the coordinate position of the mobile phone 11 may be computed without requiring transmission time t0, thereby preventing the masquerading of position by a third party, which foils any masquerading attempts by any third party.

$$r2=r1-v(v1-t2) \quad (12)$$

$$r3=r1-v(v1-t3) \quad (13)$$

$$r4=r1-v(v1-t4) \quad (14)$$

Let v(t1−t2) be α, v(t1−t3) be β, and v(t1−t4) be γ, then equation (15) is obtained from equations (4), (5), (6), (7), (12), (13), and (14). Equation (15) is used to obtain distance r1 between the receiver apparatus 31-1 and the mobile phone 11 and does not contain a variable. Because the value of r1 is always positive, the value of r1 may be uniquely obtained from equation (15).

$$r1 = \frac{-N \pm \sqrt{N^2 - MQ}}{2M} \quad (15)$$

It should be noted that M, N, and Q in equation (15) above are represented in equations (16), (17), and (18) respectively.

$$M=(\alpha^2+\beta^2+\gamma^2-1) \quad (16)$$

$$N=\alpha(1-\alpha^2)+\beta(1-\beta^2)+\gamma(1-\gamma^2) \quad (17)$$

$$Q=(1-\alpha^2)^2+(1-\beta^2)^2+(1-\gamma^2)^2 \quad (18)$$

The coordinate position computation block 124 computes r1 by computing equation (15). Also, the coordinate position computation block 124 substitutes the value of r1 obtained by computing equation (15) into equations (12), (13), and (14), thereby getting r2, r3, and r4.

Now, referring to FIG. 8 again, the coordinate position computation block 124 computes equations (12), (13), (14), and (15) on the basis of the reception time information supplied from the controller block 122 for example in step S75, thereby computing a distance between the receiver apparatus 31 and the mobile phone 11.

Therefore, if the value of each of $\alpha$, $\beta$, and $\gamma$ is (−1) for example, the value of M is 2 and values of N and Q are 0s, so that the value of r1 is 0 from equation (15). From equations (12), (13), and (14), the value of each of r2, r3, and r4 is 1(0−(−1)).

In step S76, the coordinate position computation block 124 computes the coordinate position of the mobile phone 11 on the basis of the computed distance between the receiver apparatus 31 and the mobile phone 11, upon which the processing ends.

For example, in step S76, the coordinate position computation block 124 computes equation (5), equation (6), and equation (7) on the basis of the computed distance between the receiver apparatus 31 and the mobile phone 11, thereby computing the coordinate position of the mobile phone 11, upon which the processing ends.

In this case, if the value of r1 is 0 and the values of r2, r3, and r4 are 1s in the example shown in FIG. 9 for example, x coordinate of the mobile phone 11 is 0((1+0−1)/2) from equation (5), y coordinate of the mobile phone 11 is 0((1+0−1)/2 from equation (6), and z coordinate of the mobile phone 11 is 0((1+0−1)/2 from equation (7), so that the coordinate position of the mobile phone 11 becomes (0, 0, 0).

It should be noted that, in the above-mentioned example, the distance between the receiver apparatus 31 and the mobile phone 11 is obtained to compute the coordinate position of the mobile phone 11. Also, however, the coordinate position of the mobile phone 11 may be directly computed on the basis of equations (1), (2), (3), (4), (12), (13), and (14) without obtaining the distance between the receiver apparatus 31 an the mobile phone 11.

Thus, the PC 33 computes the coordinate position of the mobile phone 11 on the basis of the reception time information supplied from the receiver apparatus 31. Computing the coordinate position of the mobile phone 11 on the basis of a UWB signal transmitted from the mobile phone 11 allows the determination of the position of the mobile phone 11 more accurately, thereby foiling masquerading attempts by any third part.

In addition, the authorized user is determined by determining whether the mobile phone 11 is at a particular position by computing the coordinate position of the mobile phone 11 and on the basis of the computed coordinate position, so that authentication area R1 may be arranged at any position in any number and the number of authentication areas R1 and positions thereof may be changed with ease.

Figure 10:
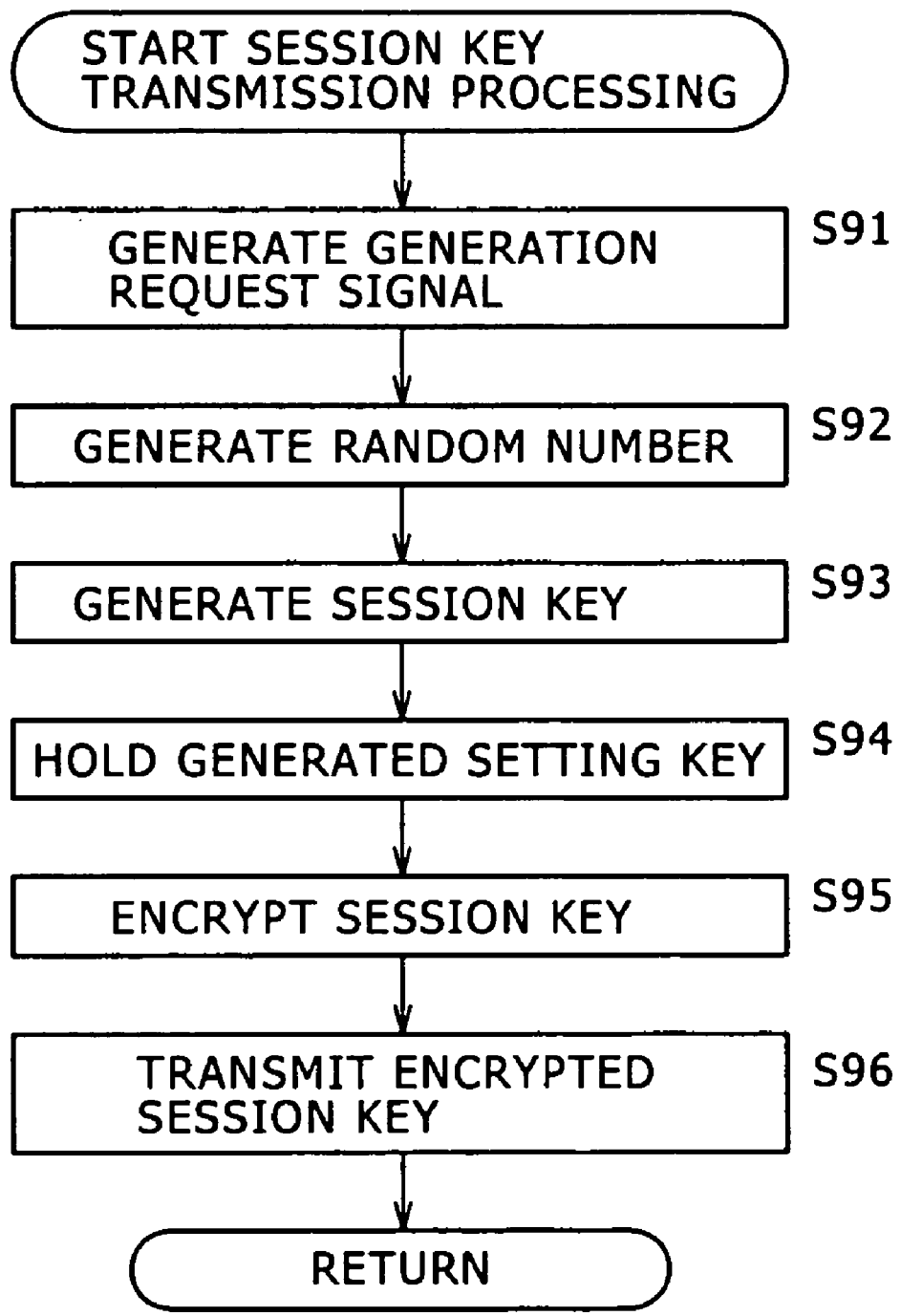
FIG. 10 is a flowchart indicative of session key transmission processing.

The following describes the processing of session key transmission corresponding to the processing of step S33 shown in FIG. 5 with reference to a flowchart shown in FIG. 10.

Because the mobile phone 11 is found positioned inside authentication area R1, then the coordinate position computation block 124 generates a generation request signal for generating a session key in step S91 and supplies the generated generation request signal to the random number generator block 125.

In step S92, receiving the generation request signal from the coordinate position computation block 124, the random number generator block 125 generates a random number and supplies the generated random number to the session key holding block 126.

In step S93, the session key holding block 126 generates a session key on the basis of the random number supplied from the random number generator block 125 and supplies the generated random number to the key holding block 123 and the encryption block 127. For example, in step S93, the session key holding block 126 generates a 56-bit session key for use in the DES scheme on the basis of the random number supplied from the random number generator block 125 and supplies the generated session key to the key holding block 123 and the encryption block 127.

In step S94, the session key holding block 151 of the key holding block 123 holds the session key received from the session key holding block 126.

In step S95, the encryption block 127 encrypts the session key supplied from the session key holding block 126 and supplies the encrypted session key to the sender apparatus 32. To be more specific, in step S95, the encryption block 127 gets a public key from the key holding block 123 and encrypts the session key supplied from the session key holding block 126 by use of the public key, and supplies the encrypted session key to the sender apparatus 32.

For example, if a public key includes two integers 13 and 391, then the encryption block 127 computes equation (19) in step S95 to encrypt the session key supplied from the session key holding block 126 and supplies the encrypted session key to the sender apparatus 32.

$$\text{(Encrypted session key)} = \text{(session key)}^{13} \bmod (391) \quad (19)$$

In the above-mentioned equation, mod denotes a remainder of the division of a predetermined number by another. Therefore, A mod (B) denotes a remainder obtained by dividing A by B.

In step S96, the sender apparatus 32 modulates the session key supplied from the encryption block 127 in the same modulation scheme as that of the modulator/demodulator block 53 under the control of the encryption block 127. Then, the sender apparatus 32 transmits the modulated session key to the mobile phone 11 as a UWB signal, upon which the processing ends.

Thus, the PC 33 generates a session key and transmits the generated session key to the mobile phone 11.

As described above, a session key is generated and the generated session key is transmitted to the mobile phone 11, so that the PC 33 and the mobile phone 11 become able to encrypt and decrypt data by use of a session key, thereby preventing the masquerading by a third party.

Figure 11:
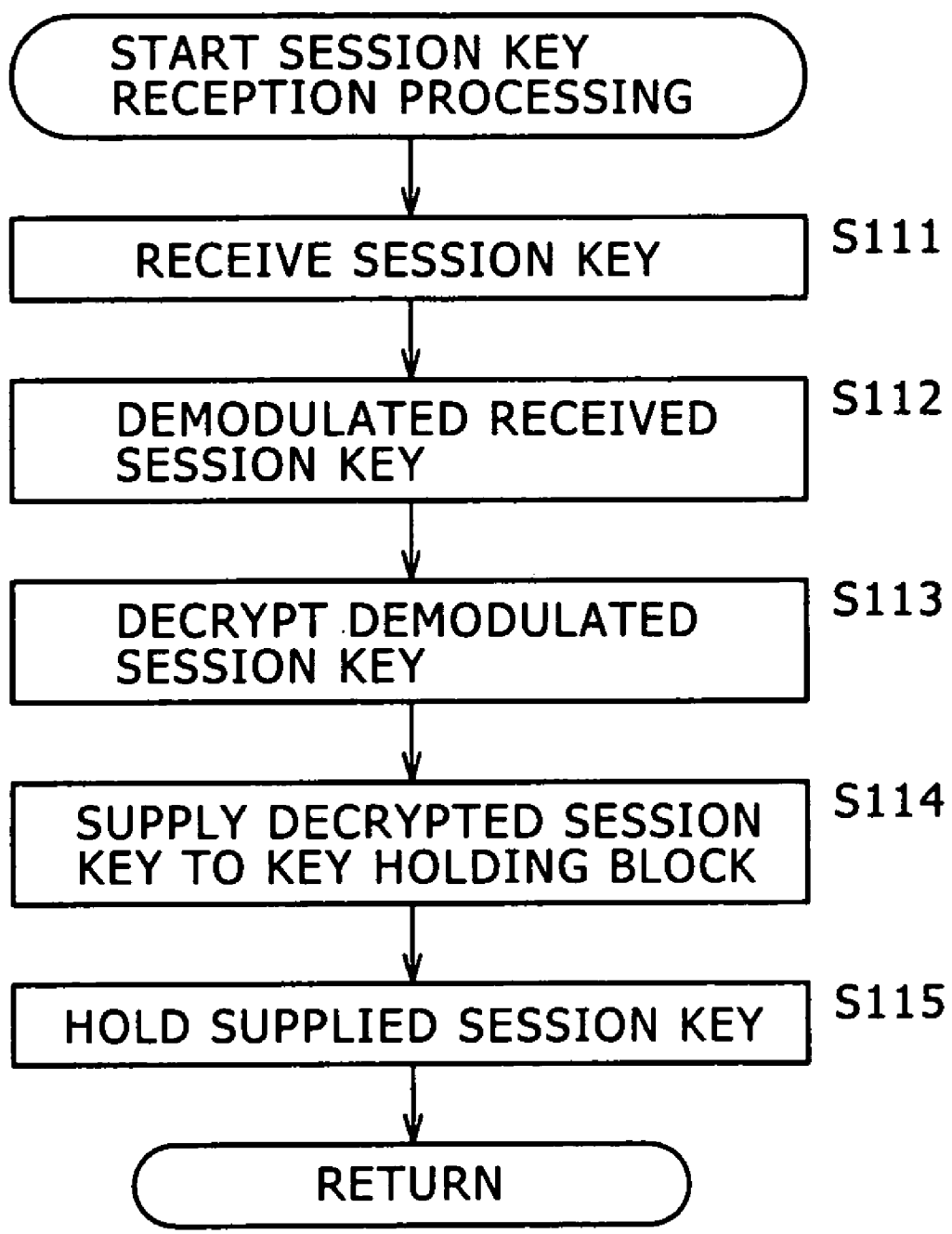
FIG. 11 is a flowchart indicative of session key reception processing.

The following describes the processing of session key reception corresponding to the processing of step S12 shown in FIG. 5 with reference to a flowchart shown in FIG. 11.

Because a session key has been transmitted from the sender apparatus 32, the antenna 54 receives the session key in step S111 and supplies the received session key to the modulator/demodulator block 53.

In step S112, the modulator/demodulator block 53 demodulates the session key received from the antenna 54 in the modulation scheme corresponding to that of the modulator/demodulator block 53 and supplies the demodulated session key to the decryption block 55.

In step S113, the decryption block 55 decrypts the session key supplied from the modulator/demodulator block 53 and supplies the decrypted session key to the controller block 56. To be more specific, in step S113, the decryption block 55 gets a private key from the key holding block 57 and decrypts the session key supplied from the modulator/demodulator block 53 by use of the obtained private key. Then, the decryption block 55 supplies the decrypted session key to the controller block 56.

For example, if the private key includes two integers 149 an 391, then, in step S113, the decryption block 55 computes equation (20) below to decrypt the session key supplied from the modulator/demodulator block 53 and supplies the decrypted session key to the controller block 56.

$$\text{(Decrypted session key)} = ((\text{encrypted session key})^{149}) \mod (391) \quad (20)$$

In step S114, the controller block 56 supplies the session key received from the decryption block 55 to the key holding block 57.

In step S115, the session key holding block 81 of the key holding block 57 holds the session key supplied from the controller block 56, upon which the processing ends.

Thus, the mobile phone 11 receives the session key and holds the received session key.

As described above, by receiving the session key transmitted from the sender apparatus 32 and holding the received session key, the mobile phone 11 becomes able to encrypt and decrypt data by use of the session key, thereby foiling any masquerading attempts by any third party.

As described above, the PC 33 computes the coordinate position of the mobile phone 11 operated by the user on the basis of reception time information and determines on the basis of the computed coordinate position whether the mobile phone 11 is positioned at a specific position, thereby determining whether the user is an authorized user, so that a plurality of authentication areas R1 may be arranged at any positions. In addition, the PC 33 computes the coordinate position of the mobile phone 11 operated by the user on the basis of reception time information, so that the position of the mobile phone 11 may be obtained more accurately, thereby foiling any masquerading attempts by any third party.

According to the present invention, a mobile phone and a PC communicate with each other, so that data may be transmitted and received between the mobile phone and the PC. Also, according to the present invention, the coordinate position of the mobile phone operated by the user is computed on the basis of reception time information and it is determined on the basis of the computed coordinate position whether the mobile phone is at a specific position to determine whether the user is an authorized user, so that a plurality of authentication areas may be set to any positions.

Further, according to the present invention, the coordinate position of the mobile phone operated by the user is computed on the basis of reception time information, so that the position of the mobile phone may be obtained more accurately, thereby foiling any masquerading attempts by any third party.

The following describes a second embodiment of the invention.

Figure 12:
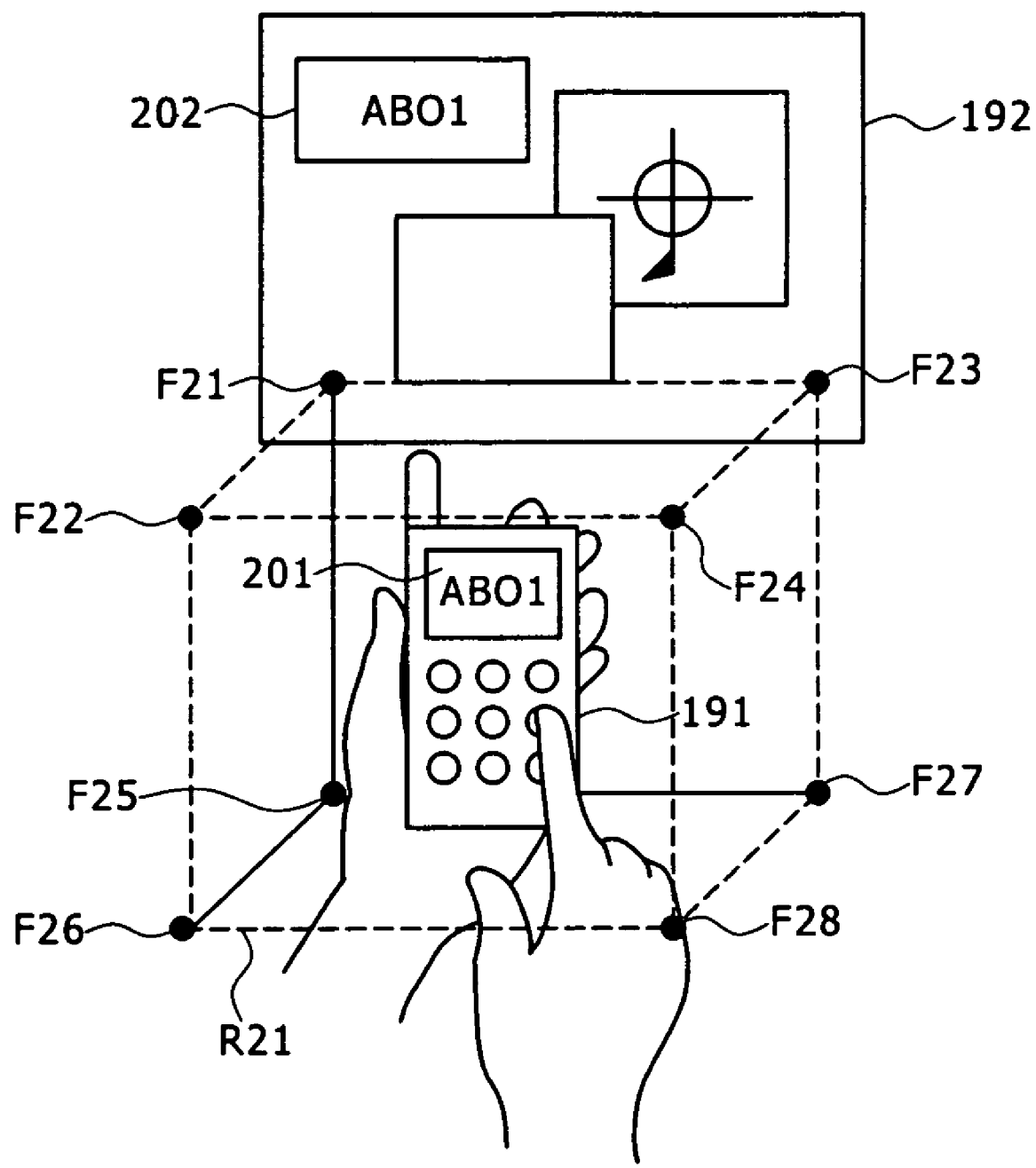
FIG. 12 is a schematic diagram illustrating the above-mentioned wireless communication system practiced as a second embodiment of the invention.

Referring to FIG. 12, there is shown a wireless communication system practiced as the second embodiment of the invention. In this wireless communication system, a mobile phone 191 operated by the user and a PC for executing user authentication communicate with each other. This PC has an output block 192, which is a display monitor.

Area R21, which is a cuboid having apexes F21 through F28, provides a predetermined authentication area. When the user operates the mobile phone 191 to execute authentication processing inside authentication area R21, the PC determines that the user is an authorized user; if the user operates the mobile phone 191 to execute authentication processing outside authentication area R21, the PC determines that the user is not an authorized user.

The PC receives a signal transmitted from the mobile phone 191 and obtains the position of the mobile phone 191 on the basis of the received signal. If the position of the mobile phone 191 is inside authentication area R21, then the PC determines that the user is an authorized user; if the position of the mobile phone 191 is outside authentication area 21, then the PC determines that the user is not an authorized user.

For example, the mobile phone 191 generates a public key on the basis of a private key held in advance and transmits the generated public key to the PC by UWB communication.

The PC receives the public key transmitted from the mobile phone 191. Then, the PC computes the coordinate position, which is the current position of the mobile phone 191, on the basis of reception time information indicative of the time at which the public key has been received.

The PC determines whether the computed coordinate position is inside authentication area R21, thereby determining whether the user operating the mobile phone 191 is an authorized user.

If the computed coordinate position is inside authentication area R21, then the PC determines that the user of the mobile phone 191 is an authorized user, so that the PC generates a session key and encrypts the generated session key by use of the received public key. Next, the PC transmits the encrypted session key to the mobile phone 191 by UWB communication. Also, the PC generates a hash value of the session key and displays the generated hash value on the output block 192, which is a display monitor. In this example, hash value "AB01" is displayed in an area 202 of the output block 192.

On the other hand, the mobile phone 191 receives the session key from the PC and decrypts the received session key by use of the private key held in advance. The mobile phone 191 generates a hash value of the decrypted session key and displays the generated hash value on a output block 201. In this example, hash value "AB01" is displayed on the output block 201.

Here, the user compares the hash value displayed in the area 202 of the output block 192 of the PC with the hash value displayed on the output block 201 of the mobile phone 191 to check if the mobile phone 191 correctly communicates with the PC.

If the computed coordinate position is found not inside authentication area R21, then the PC determines that the user of the mobile phone 191 is not an authorized user, generating no session key.

Figure 13:
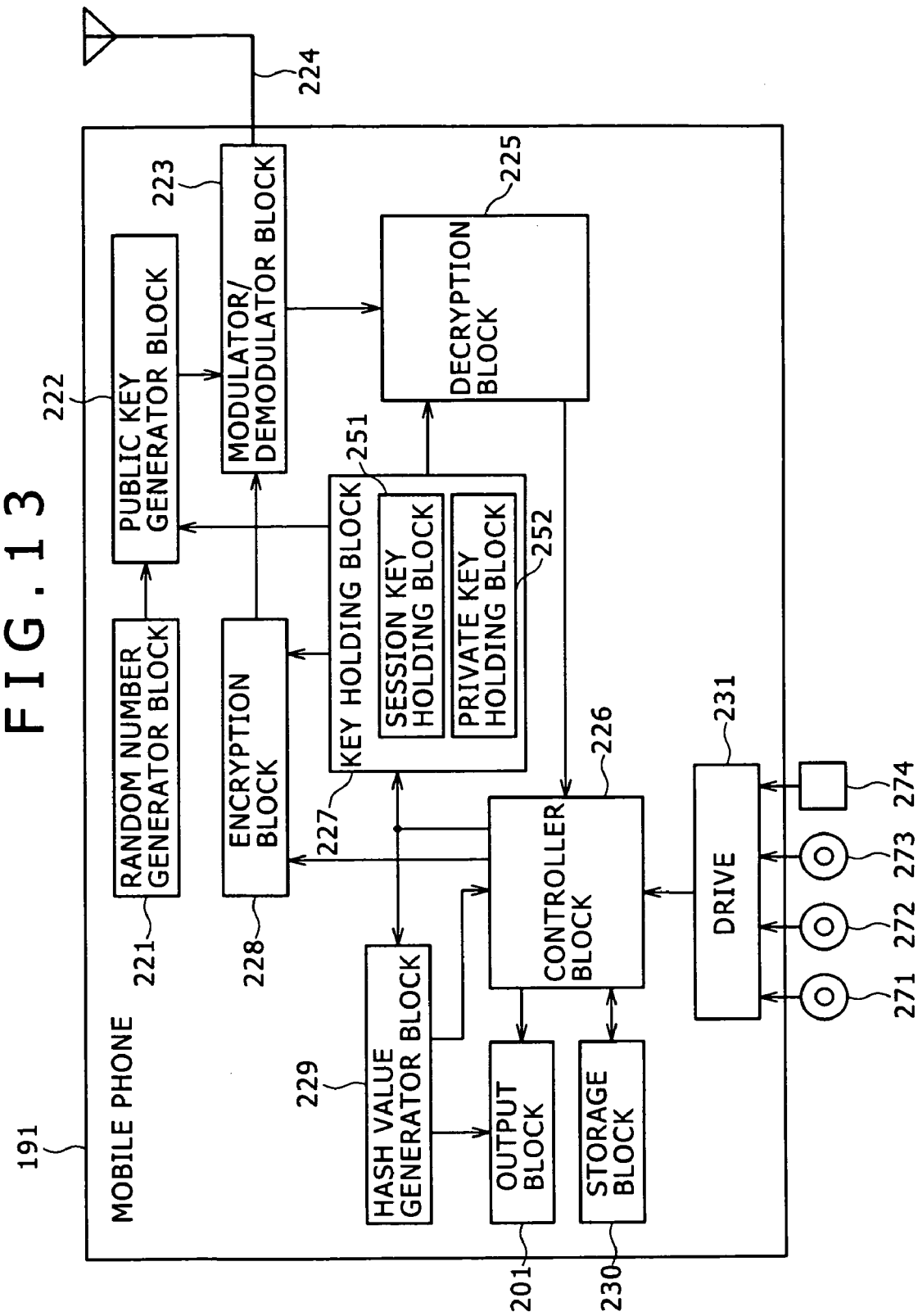
FIG. 13 is a block diagram illustrating a functional configuration of a mobile phone.

Referring to FIG. 13, there is shown a block diagram of a functional configuration of the mobile phone 191.

The mobile phone 191 has the output block 201, a random number generator block 221, a public key generator block 222, a modulator/demodulator block 223, an antenna 224, a decryption block 225, a controller block 226, a key holding block 227, an encryption block 228, a hash value generator block 229, a storage block 230, and a drive 231.

It should be noted that the random number generator 221, the public key generator block 222, the modulator/demodulator block 223, the antenna 224, the decryption block 225, the key holding block 227, the encryption block 228, the storage block 230, and the drive 231 are substantially the same in functional configuration as the random number generator 51, the public key generator block 52, the modulator/demodulator block 53, the antenna 54, the decryption block 55, the key holding block 57, the encryption block 58, the storage block 59, and drive 61 shown in FIG. 3 respectively, so that the description thereof will be skipped.

The drive 231 drives a magnetic disk 271, an optical disk 272, a magneto-optical disk 273, or a semiconductor memory 274 loaded thereon, thereby reading programs and data from the loaded recording medium. The obtained programs and data are transferred to the controller block 226.

The controller block 226, made up of a built-in microprocessor or a system LSI for example, controls the mobile phone 191 in its entirety. The controller block 226 supplies a session key received from the decryption block 225 to the key holding block 227 and the hash value generator block 229. Also, the controller block 226 supplies the data received from the decryption block 225 to the storage block 230 or the output block 201 as required.

The controller block 226 gets predetermined data from the storage block 230 as required and supplies the obtained data to the encryption block 228. For example, receiving a signal from the decryption block 225 indicative of a request for the transmission of a user ID transmitted from a sender apparatus (not shown), the controller block 226 gets the user ID from the storage block 230 and supplies the obtained user ID to the encryption block 228.

The controller block 226 reads a program supplied from a recording medium loaded on the drive 231 as required and executes the program. Also, if a program or data comes from the drive 231, the controller block 226 supplies the received program or data to the storage block 230 as required, reads the program recorded to the storage block 230, and executes this program.

The hash value generator block 229 computes a hash function stored in advance on the basis of the session key supplied from the controller block 226, thereby generating a hash value of the session key. The hash value generator block 229 supplies the generated hash value to the controller block 226. Also, the hash value generator block 229 generates data for hash value display and supplies the generated data to the output block 201.

A hash function denotes is a unidirectional function for converting a variable-length input value into a fixed-length output value (or a hash value). The hash value generator block 229 stores the same hash function as the hash function stored in a hash value generator block 318 (FIG. 14) such as SHA (Secure Hash Algorithm) or MD (Message Digest).

The output block 201, made up of a display monitor, speaker, and/or indicators, outputs data supplied from the controller block 226. For example, the output block 201, which is a display monitor, displays images on the basis of image data supplied from the controller block 226.

The output block 201 displays a hash value on the output block 201, which is a display monitor, on the basis of the data for hash value display.

Figure 14:
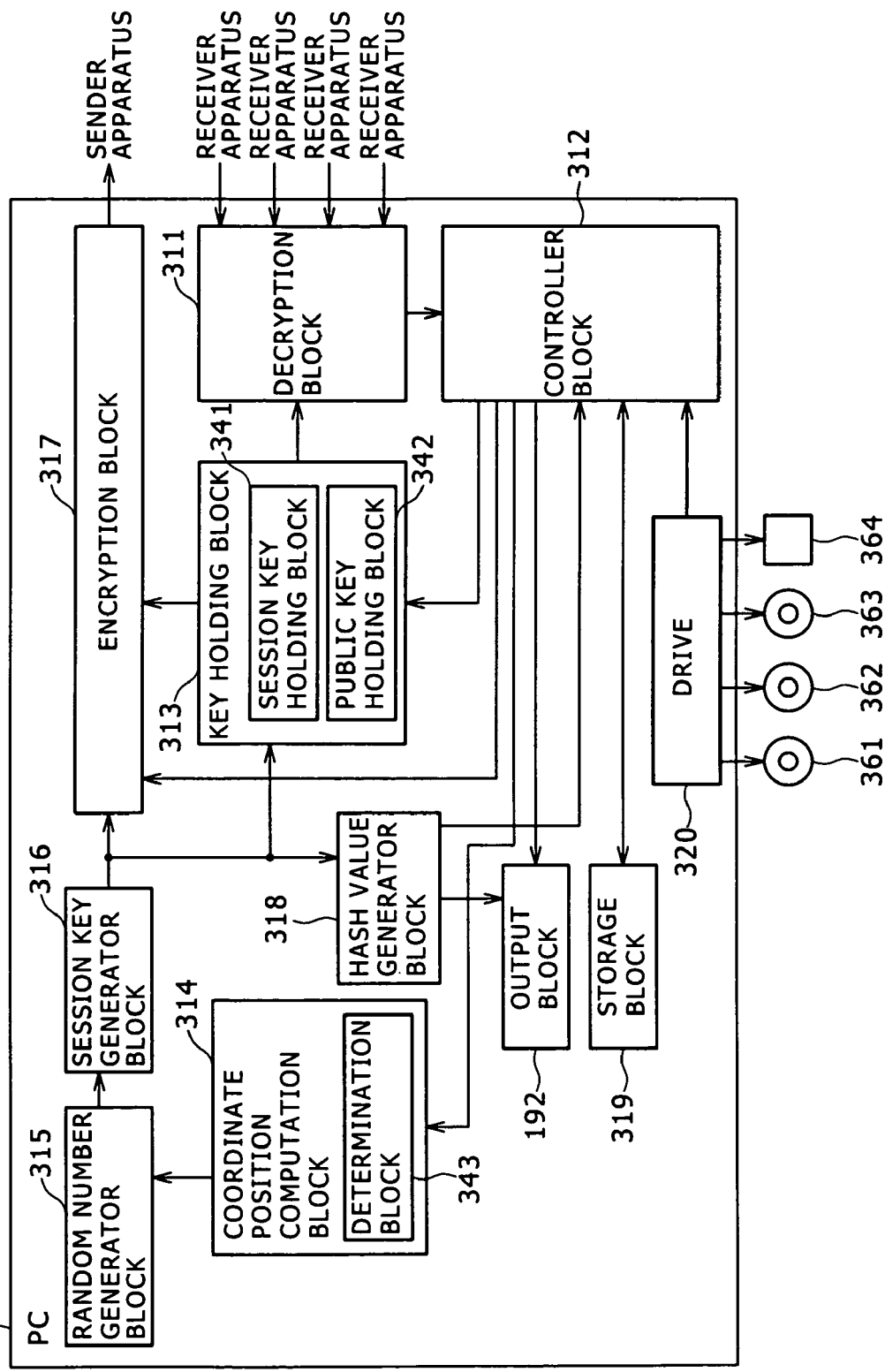
FIG. 14 is a block diagram illustrating a functional configuration of a PC.

Referring to FIG. 14, there is shown a functional configuration of the PC.

The PC 291 has the output block 192, a decryption block 311, a controller block 312, a key holding block 313, a coordinate position computation block 314, a random number generator block 315, a session key generator block 316, an encryption block 317, a hash value generator block 318, a storage block 319, and a drive 320.

It should be noted that the decryption block 311, controller block 312, the key holding block 313, the coordinate position computation block 314, the random number generator block 315, the encryption block 317, the storage block 319, and the drive 320 are substantially the same in functional configuration as the decryption block 121, the controller block 122, the key holding block 123, the coordinate position computation block 124, the random number generator block 125, the encryption block 127, the storage block 128, and the drive 129 shown in FIG. 4, so that the description thereof will be skipped.

The key holding block 313, made up of a memory such as RAM for example, stored with a session key and a public key. The key holding block 313 has a session key holding block 341 and a public key holding block 342. The drive 320 drives a magnetic disk 361, an optical disk 362, a magneto-optical disk 363, or a semiconductor memory 364 loaded thereon, thereby reading programs and data from the loaded recording medium. The obtained programs and data are transferred to a controller block 312.

The session key generator block 316 generates a session key on the basis of a random number supplied from the random number generator block 315 and supplies the generated random number to the key holding block 313, the encryption block 317, and hash value generator block 318.

The hash value generator block 318 computes a hash function stored in advance on the basis of the session key supplied from the session key generator block 316, thereby generating a hash value of the session key. The hash value generator block 318 supplies the generated hash value to the controller block 312. Also, the hash value generator block 318 generates data for hash value display and supplies the generated data to the output block 192.

The hash value generator block 318 stores the same hash function as the hash function stored in the hash value generator block 229 such as SHA or MD5 for example.

The output block 192, based on a display monitor, a speaker, and/or indicators, outputs data supplied from the controller block 312. For example, the output block 192, which is a display monitor, displays images on the basis of image data supplied from the controller block 312. The output block 192 displays a hash value on the output block 192, which is a display monitor, on the basis of the data for hash value display supplied from the hash value generator block 318.

Figure 15:
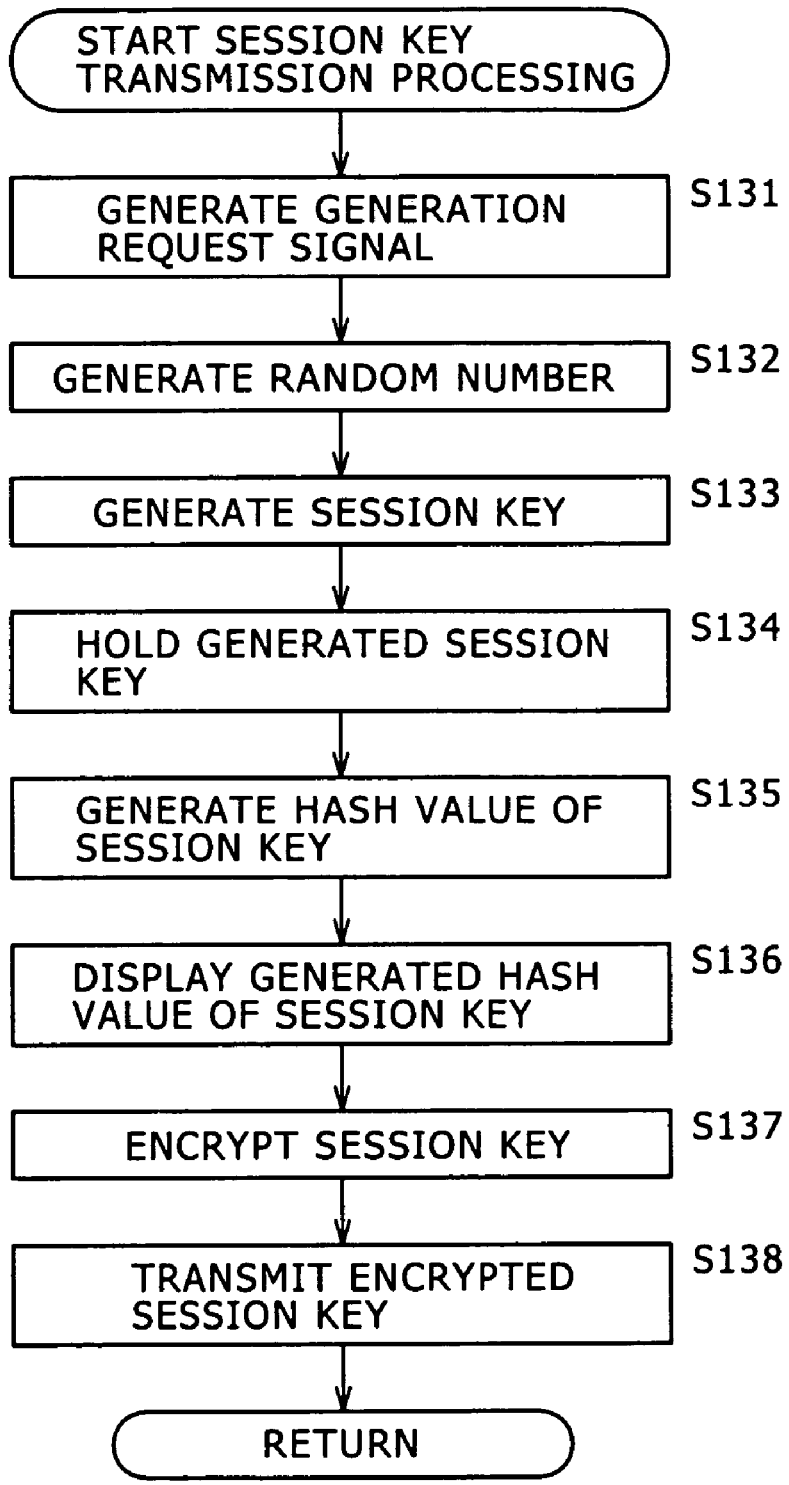
FIG. 15 is a flowchart indicative of session key transmission processing.
Figure 16:
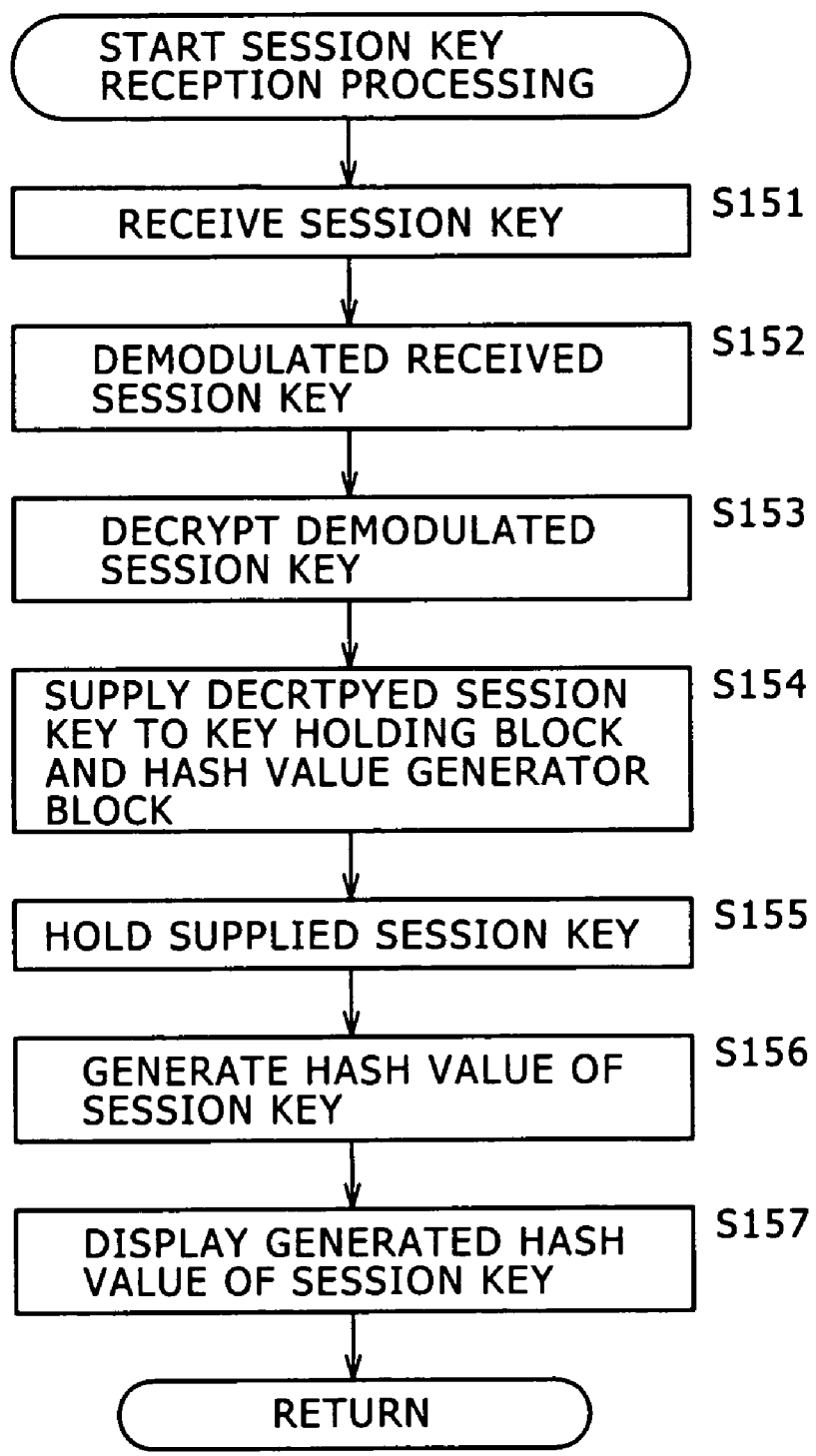
FIG. 16 is a flowchart indicative of session key reception processing.

The following describes specific processing with reference to FIGS. 15 and 16. It should be noted that the processing of key holding by the mobile phone 191 and the processing of session key transmission by the PC 291 are substantially the same as those described with reference to the flowcharts shown in FIGS. 5 and 6, so that the description thereof will be skipped.

Now, with reference to the flowchart shown in FIG. 15, the processing of session key transmission by the PC 291 will be described. It should be noted that the processing of step S131 and the processing of step S132 are substantially the same as those of steps S91 and S92 respectively, so that the description thereof will be skipped.

In step S133, the session key generator block 316 generates a session key on the basis of the random number supplied from the random number generator block 315 and supplies the generated session key to the key holding block 313, the encryption block 317, and the hash value generator block 318. For example, in step S133, the session key generator block 316 generates a 56-bit session key for use in the DES scheme on the basis of the random number supplied from the random number generator block 315 and supplies the generated session key to the key holding block 313, the encryption block 317, and the hash value generator block 318.

In step S134, a session key holding block 341 of the key holding block 313 holds the session key supplied from the session key generator block 316.

In step S135, the hash value generator block 318 generates a hash value of the session key on the basis of the session key supplied from the session key generator block 316. The hash value generator block 318 generates the data for hash value display on the basis of the generated hash value and supplies the generated data to the output block 192.

For example, in step S135, the hash value generator block 318 computes the same hash function as the hash function stored in the hash value generator block 229 such as SHA or MD5 on the basis of the session key supplied from the session key generator block 316, thereby generating a hash value of the session key. The hash value generator block 318 generates the data for hash value display on the basis of the generated hash value and supplies the generated data to the output block 192.

In step S136, the output block 192 displays the hash value supplied from the hash value generator block 318 onto the output block 192, which is a display monitor, on the basis of the data for hash value display supplied from the hash value generator block 318.

The processing of step S137 and the processing of step S138 are substantially the same as those of steps S95 and S96 respectively, so that the description thereof will be skipped.

Thus, the PC 291 generates a session key and transmits the generated session key to the mobile phone 191. Also, the PC 291 generates a hash value of the generated session key and displays the generated hash value on the output block 192, which is a display monitor.

As described above, by generating a hash value of a generated session key and displaying the generated hash value on the output block 192, the PC 291 is capable of telling the user that the PC 291 is correctly communicating with the mobile phone 191.

The following describes the processing of receiving a session key by the mobile phone 191 with reference to a flowchart shown in FIG. 16. It should be noted that the processing of steps S151 through S153 is substantially the same as the processing of steps S111 through S113 shown in FIG. 11, so that the description thereof will be skipped.

In step S154, the controller block 226 supplies a session key received from the decryption block 225 and supplies the received session key to the key holding block 227 and the hash value generator block 229.

In step S155, a session key holding block 251 of the key holding block 227 holds the session key received from the controller block 226.

In step S156, the hash value generator block 229 generates a hash value of the session key on the basis of the session key supplied from the controller block 226. The hash value generator block 229 generates the data for hash value display and supplies the generated data to the output block 201.

For example, in step S156, the hash value generator block 229 computes a hash function such as SHA or MD5 stored in advance on the basis of the session key supplied from the controller block 226, thereby generating a hash value of the session key. The hash value generator block 229 generates the data for hash value display and supplies the generated data to the output block 201, which is a display monitor.

In step S157, the output block 201 displays the hash value on the output block 201 on the basis of the data for hash value display supplied from the hash value generator block 229, upon which the processing ends.

Thus, the mobile phone 191 receives a session key transmitted from a sender apparatus and holds the received session key. Also, the mobile phone 191 generates a hash value of the session key and displays the generated hash value on the output block 201, which is a display monitor.

As described above, by generating a hash value of a session key and displaying the generated hash value, the mobile phone 191 is able to tell the user that the mobile phone 191 is correctly communicating with the PC 291. Also, if the hash value displayed on the output block 201, which is the display monitor of the mobile phone 191 differs from the hash value displayed on the output block 192, which is the display monitor of the PC 291, the user may determine that unauthorized communication is being executed by some third party. If this happens, the user may discontinue this communication, thereby foiling the masquerading by a third party.

As described above, the coordinate position of the mobile phone 191 operated by the user is computed on the basis of reception time information and it is determined on the basis of the computed coordinate position whether the mobile phone 191 is at a specific position in order to determine whether the user is an authorized user. This novel configuration allows the arrangement of a plurality of authentication areas R21 at any positions. In addition, the coordinate position of the mobile phone 191 operated by the user is computed on the basis of reception time information, so that the position of the mobile phone 191 may be obtained more correctly, thereby preventing any masquerading attempts by any third party.

According to the present invention, a mobile phone and a PC communicate with each other to allow the transmission and reception of data between the mobile phone and the PC. Also, according to the present invention, the coordinate position of the mobile phone operated by the user is computed on the basis of reception time information and it is determined on the basis of the computed coordinate position whether the mobile phone is at a specific position to determine whether the user is an authorized user, so that a plurality of authentication areas may be set to any positions.

Further, according to the present invention, the coordinate position of the mobile phone operated by the user is computed on the basis of reception time information, so that the position of the mobile phone may be obtained more accurately, thereby foiling any masquerading attempts by any third party.

Figure 17:
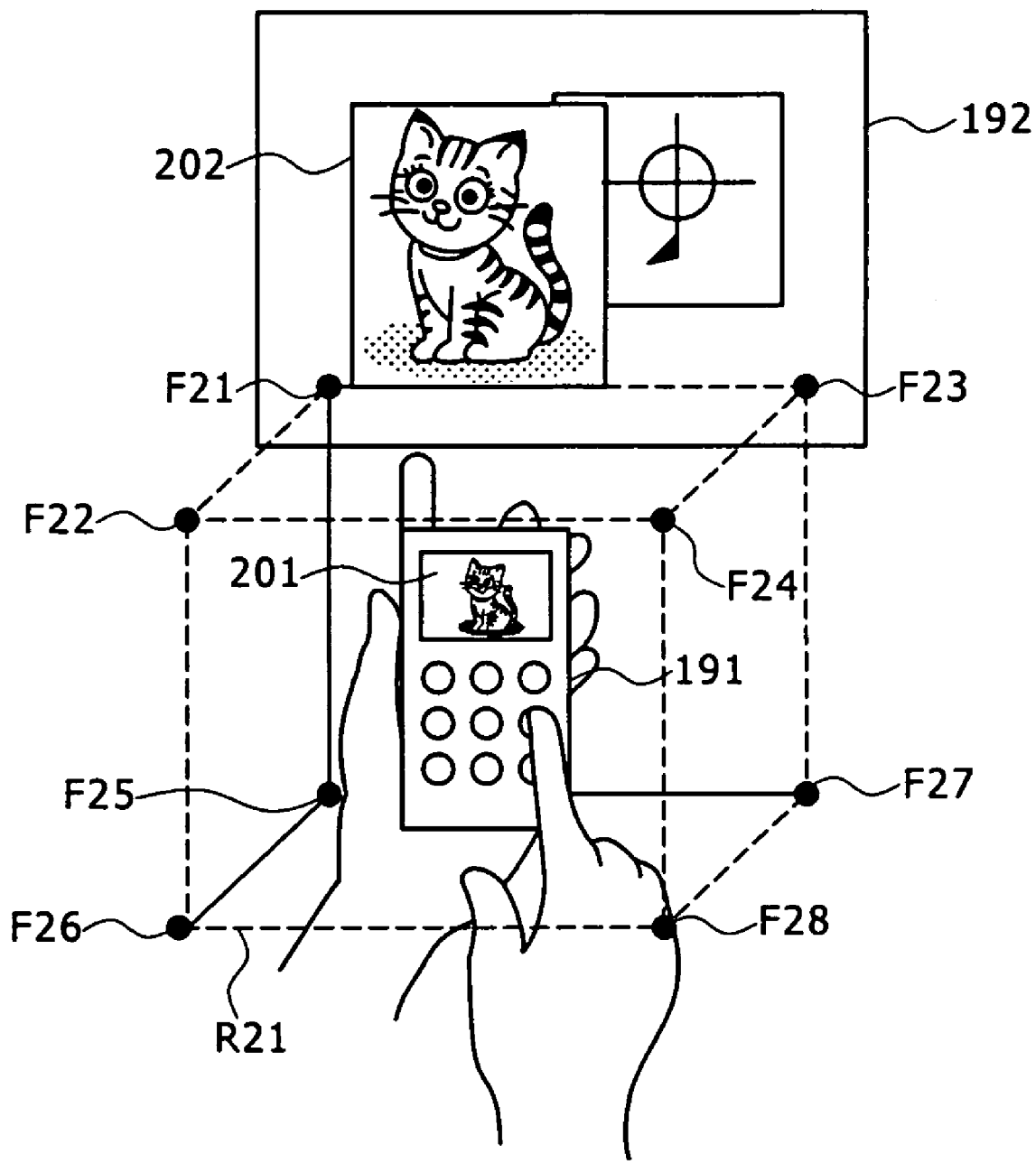
FIG. 17 is a schematic diagram illustrating the above-mentioned wireless communication system shown practiced as still another embodiment of the invention.

It should be noted that, with the PC 291 and the mobile phone 191, a session key hash value is generated and the generated hash value is displayed; alternatively, an image corresponding to the generated hash value may be displayed as shown in FIG. 17.

Referring to FIG. 17, components corresponding to those shown in FIG. 12 are denoted by the same reference numerals and the description thereof will be skipped for brevity.

The PC 291 generates a session key hash value and displays an image representative of the generated hash value into an area 202 of the output block 192, which a display monitor. The image representative of a generated hash value denotes an image that is displayed on the basis of the image data having an image data identification ID, for example.

In this case, the hash value generator block 318 generates a session key hash value on the basis of a session key supplied from the session key generator block 316 and supplies the generated hash value to the controller block 312. Then, the controller block 312 gets the image data from the storage block 319. The image data is identified by the hash value supplied from the hash value generator block 318 and supplies the obtained image data to the output block 192. Next, the output block 192 displays an image on the output block 192, which is a display monitor, on the basis of the image data supplied from the controller block 312.

Therefore, if the hash value generated by the PC 291 is "AB01" for example, the PC 291 displays an image in the area 202 of the output block 192 on the basis of the image data with the ID thereof being "AB01".

On the other hand, the mobile phone 191 receives a session key transmitted from the PC 291 and decrypts the received session key by use of a private key held in advance. The mobile phone 191 generates a hash value of the decrypted session key and displays an image representative of the generated hash value onto the output block 201, which is the display monitor of the mobile phone 191.

In this case, the hash value generator block 229 generates the session key hash value on the basis of the session key supplied from the controller block 226 and supplies the generated hash value to the controller block 226. The controller block 226 gets, from the storage block 230, image data identified by the hash value supplied from the hash value generator block 229 and supplies the obtained image data to the output block 201. Then, on the basis of the image data supplied from the controller block 226, the output block 201 displays the image on the output block 201, which is the display monitor.

Therefore, if the session key hash value received by the mobile phone 191 is "AB01" for example, the mobile phone 191 displays the image on the output block 201, which is the display monitor, on the basis of the image data with the ID thereof being "AB01".

Thus, the user compares the image displayed in the area 202 of the output block 192, which is the display monitor of the PC 291, with the image displayed on the output block 201, which is the display monitor of the mobile phone 191, thereby checking if the mobile phone 191 is correctly communicating with the PC 291.

If the image displayed in the area 202 of the output block 192, which is the display monitor of the PC 291, differs from the image displayed on the output block 201, which is the display monitor of the mobile phone 191, the user determines that unauthorized communication is being executed and discontinues the communication, thereby foiling masquerading by a third party.

Figure 18:
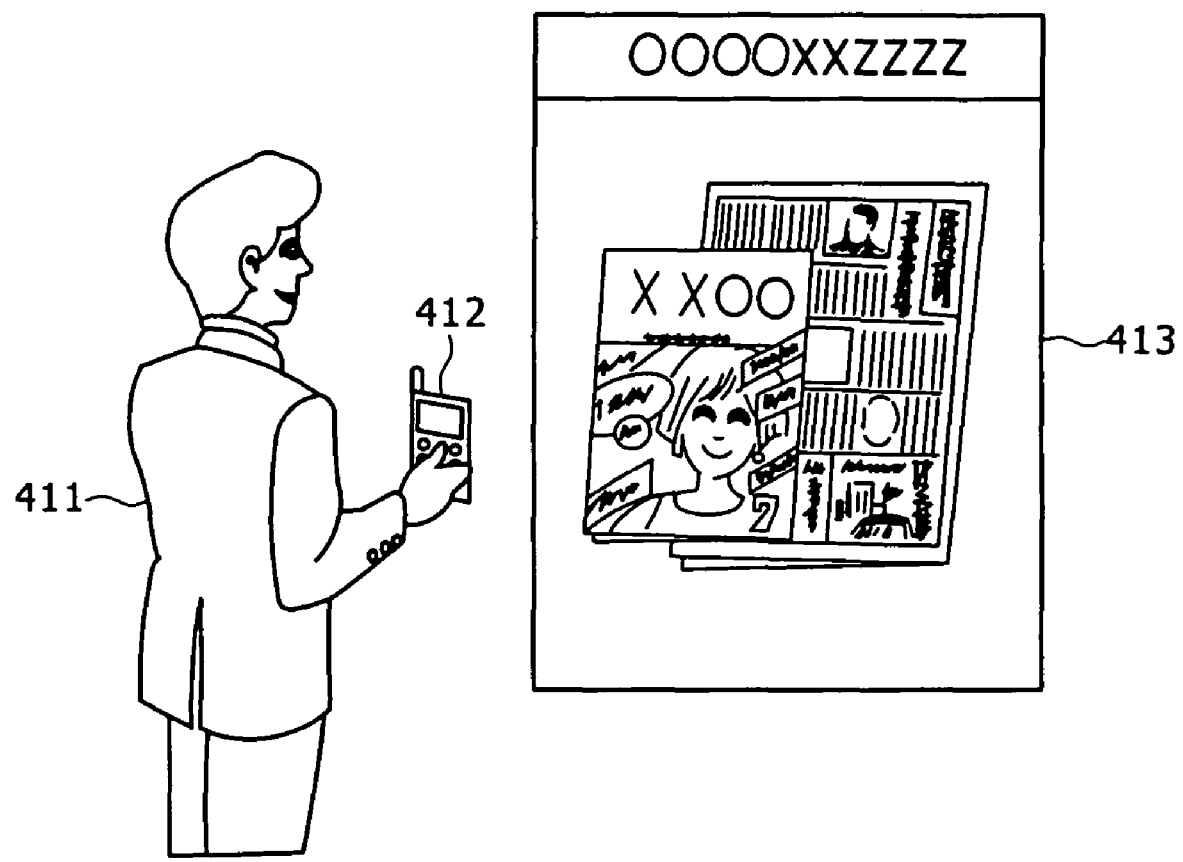
FIG. 18 is a schematic diagram illustrating the above-mentioned wireless communication system practiced as yet another embodiment of the invention.
Figure 19:
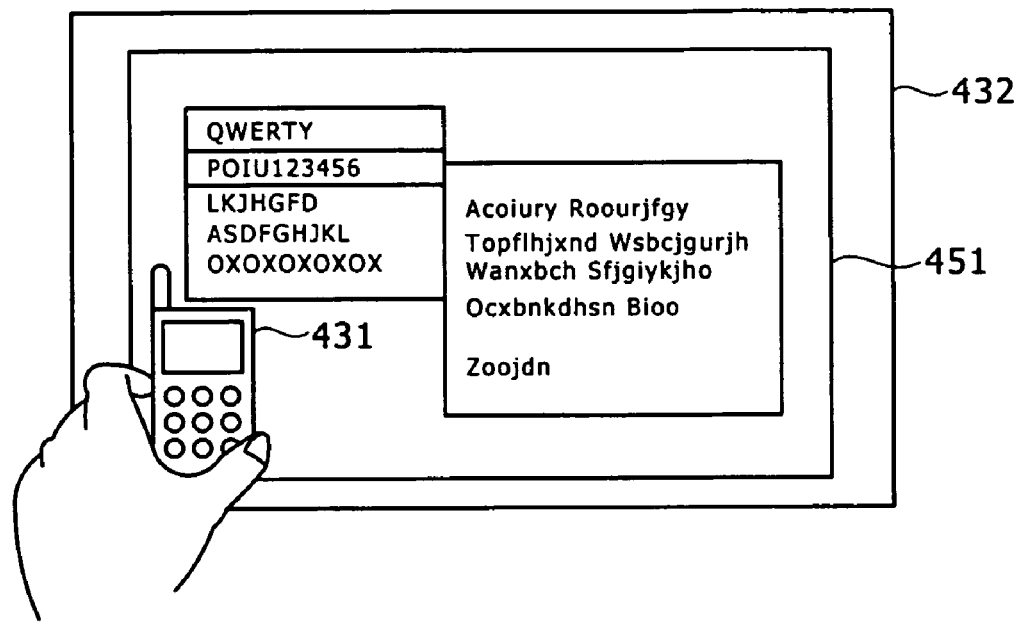
FIG. 19 is a schematic diagram illustrating the above-mentioned wireless communication system practiced as another embodiment of the invention.
Figure 20:
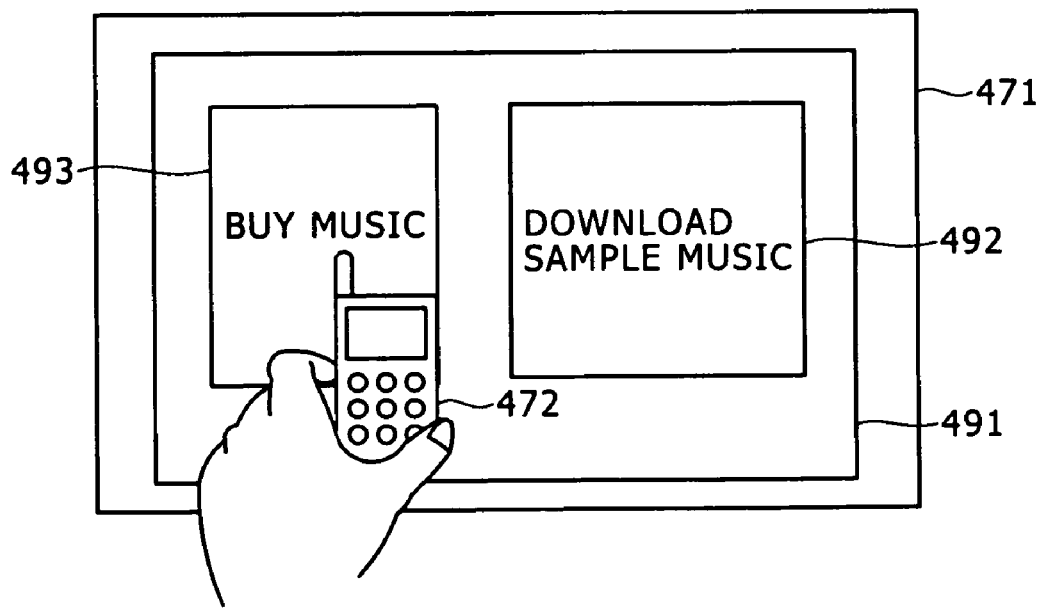
FIG. 20 is a schematic diagram illustrating the above-mentioned wireless communication system practiced as still another embodiment of the invention.

The above-mentioned wireless communication system may be used in any manners shown in FIGS. 18 through 20.

Referring to FIG. 18, a user 411 operates a mobile phone 412 to connect to a PC (not shown). An authentication area (not shown) is set around a signboard 413. The signboard 413 displays services obtainable by the connection of the user 411 to the PC, a connection method, and an operational procedure of the mobile phone 412, for example.

The user 411 references services obtainable by the connection of the user 411 to the PC, a connection method, and an operational procedure of the mobile phone 412, for example, to operate the mobile phone 412, thereby downloading the information displayed on the signboard 413, for example. The mobile phone 412 receives a session key encrypted by a public key and encrypts data to be communicated by use of the received session key, so that the information, if intercepted by a third party, is prevented from leaking out.

Referring to FIG. 19, when the user arranges a mobile phone 431 on a display 432 connected to a PC (not shown), the mobile phone 431 may be connected to the PC. In this case, an authentication area (not shown) is arranged in the vicinity of a display area 451 of the display 432.

The display area 451 of the display 432 shows the contents of services to be provided by the PC and an operational procedure of the mobile phone 431 necessary for getting services from the PC, for example. The user references the contents of services to be provided by the PC and an operational procedure of the mobile phone 431 necessary for getting services from the PC, for example, on the display area 451 thereby operating the mobile phone 431.

Thus, the user may only put the mobile phone 431 onto the display 432 to connect the mobile phone to the PC.

Further, the positioning based on a UWB signal is capable of measurement with an error as small as several centimeters and permits the change of authentication area positions and the number of authentication areas as desired.

Therefore, as shown in FIG. 20, areas 492 and 493 may be arranged in a display area 491 of a display 471 connected to a PC (not shown) and a mobile phone 472 may be arranged in the area 492 or 493, thereby specifying processing.

For example, the area 492 shows text "Download Sample Music" and the user may arrange the mobile phone 472 on the area 492, thereby starting the processing of purchasing music sample data.

On the other hand, text "Buy Music" is displayed on the area 493 and the user may arrange the mobile phone 472 on the area 493, thereby starting the processing of downloading music data.

It should be noted that, in the above description, a mobile phone and a PC communicate with each other by the UWB scheme; alternatively, this communication may be executed by CDMA (Code Division Multiple Access) for example. In the above description, a sender apparatus and a receiver apparatus are connected to a PC; it is also practicable that a sender apparatus and a receiver apparatus are built in a PC, for example.

Further, the above-mentioned wireless communication systems according to the invention are each made up of a mobile phone and a PC; it is also practicable that the wireless communication systems according to the invention are each made up of a dedicated terminal apparatus and a PDA (Personal Digital Assistant), for example.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 4 for example, these recording media are constituted by not only a package media distributed separately from the PC itself made up of the magnetic disk 171 (including flexible disks), the optical disk 172 (including CD-ROM [Compact Disk Read Only Memory] and DVD [Digital Versatile Disk]), the magneto-optical disk 173 (including MD [Mini Disk] [trademark]), or the semiconductor memory 174, but also the ROM (not shown) or the storage block 128 which stores programs and is provided to users as incorporated in the PC itself.

It should be noted that each program for executing the above-mentioned sequence of processing operations may be installed on a PC or a mobile phone via an interface such as a router or a modem as required from a local area network, the Internet, digital satellite broadcasting, or other wired or wireless communication media.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. A wireless communication system, comprising:
a first information processing apparatus and a second information processing apparatus communicating with each other in a wireless manner,
said first information processing apparatus including
first transmission means for initially transmitting a wireless signal for computing a location of said first information processing apparatus to said second information processing apparatus; and
said second information processing apparatus including
first reception means for receiving said wireless signal, transmitted from said first information processing apparatus, at a plurality of positions;
computation means for computing said location of said first information processing apparatus on the basis of reception times of said wireless signal received at said plurality of positions;
determination means for determining whether said computed location of said first information processing apparatus is inside a predetermined area; and
second transmission means for transmitting, if said computed location of said first information processing apparatus is found inside said predetermined area, data necessary for encrypting or decrypting information to be communicated between said first information processing apparatus and said second information processing apparatus;
said first information processing apparatus further including
second reception means for receiving said data transmitted from said second information processing apparatus;
first hash value generating means for generating a first hash value of said data; and
first display means for displaying said generated first hash value; and
said second information processing apparatus further includes,
second hash value generating means for generating a second hash value of said data; and
second display means for displaying said generated second hash value.

2. The wireless communication system according to claim 1, wherein said first transmission means transmits said wireless signal for computing said location of said first information processing apparatus to said second information processing apparatus in a UWB (Ultra Wide Band) manner, and
said first reception means receives said wireless signal at said plurality of positions in a UWB manner.

3. The wireless communication system according to claim 1, wherein said first information processing apparatus further comprises:
first hash value generating means for generating a first hash value of said data; and
first display means for displaying an image that is identified by said first hash value; and
said second information processing apparatus further comprises:
second hash value generating means for generating a second hash value of said data; and
second display means for displaying an image that is identified by said second hash value.

4. An information processing apparatus, comprising:
reception means for receiving a wireless signal, transmitted from an opposite party, at a plurality of positions;
computation means for computing a location of said opposite party on the basis of reception times of said wireless signal received at said plurality of positions;
determination means for determining whether said computed location of said opposite party is inside a predetermined area;
transmission means for transmitting, if said computed location of said opposite party is found inside said predetermined area, data necessary for encrypting or decrypting information to be communicated between said opposite party and said information processing apparatus;
hash value generating means for generating a hash value of said data; and
display means for displaying said generated hash value.

5. An information processing method performed by a computer configured as an information processing apparatus, comprising:
controlling, by a processor of the information processing apparatus, reception of a wireless signal, transmitted from another information processing apparatus, at a plurality of positions;
computing a location of said another information processing apparatus on the basis of reception times of said wireless signal received at said plurality of positions; and
determining whether said computed location of said another information processing apparatus is inside a predetermined area;
transmitting, if said computed location of said another information processing apparatus is found inside said predetermined area, data necessary for encrypting or decrypting information to be communicated between said another information processing apparatus and said information processing apparatus;
generating a hash value of said data; and
displaying said generated hash value.

6. A computer-readable storage medium having embedded therein instructions, which when executed by a processor, cause the processor to perform a method comprising:
controlling, by a processor of the information processing apparatus, reception of a wireless signal, transmitted from another information processing apparatus, at a plurality of positions;
computing a location of said another information processing apparatus on the basis of reception times of said wireless signal received at said plurality of positions; and
determining whether said computed location of said another information processing apparatus is inside a predetermined area;
transmitting, if said computed location of said another information processing apparatus is found inside said predetermined area, data necessary for encrypting or decrypting information to be communicated between said another information processing apparatus and said information processing apparatus;
generating a hash value of said data; and
displaying said generated hash value.

7. The information processing apparatus according to claim 4, wherein
the display means displays an image that is identified by said hash value.

8. The information processing method according to claim 5, wherein
displaying said generated hash value includes displaying an image that is identified by said hash value.

9. The computer-readable storage medium according to claim 6, wherein
displaying said generated hash value includes displaying an image that is identified by said hash value.

10. The wireless communication system according to claim 1, wherein said second information processing apparatus further includes,
session key generating means for generating a session key when said computed location of said first information processing apparatus is found inside said predetermined area;
session key encrypting means for encrypting the session key using a public key; and
session key transmitting means for transmitting the encrypted session key to said first information processing apparatus, and
said first information processing apparatus further includes,
session key receiving means for receiving the encrypted session key from said second information processing apparatus; and
session key decrypting means for decrypting the encrypted session key using a private key.

11. The information processing apparatus according to claim 4, further comprising:
session key generating means for generating a session key when said computed location of said another information processing apparatus is found inside said predetermined area;
session key encrypting means for encrypting the session key using a public key; and
session key transmitting means for transmitting the encrypted session key to said another information processing apparatus, wherein
said another information processing apparatus receives the encrypted session key and decrypts the encrypted session key using a private key.

12. The information processing method according to claim 5, further comprising:
generating, in the processor, a session key when said computed location of said another information processing apparatus is found inside said predetermined area;
encrypting, in the processor, the session key using a public key;
transmitting, from said information processing apparatus, the encrypted session key to said another information processing apparatus;
receiving, at said another information processing apparatus, the encrypted session key; and
decrypting, in said another information processing apparatus, the encrypted session key using a private key.

13. The computer-readable storage medium according to claim 6, further comprising:
generating, in the processor, a session key when said computed location of said another information processing apparatus is found inside said predetermined area;
encrypting, in the processor, the session key using a public key;
transmitting, from said information processing apparatus, the encrypted session key to said another information processing apparatus;
receiving, at said another information processing apparatus, the encrypted session key; and
decrypting, in said another information processing apparatus, the encrypted session key using a private key.

* * * * *